(12) United States Patent
Aho et al.

(10) Patent No.: US 8,988,336 B2
(45) Date of Patent: Mar. 24, 2015

(54) DUAL-ORIENTATION AUTOSTEREOSCOPIC BACKLIGHT AND DISPLAY

(75) Inventors: Erik A. Aho, North Saint Paul, MN (US); Martin B. Wolk, Woodbury, MN (US); Michael J. Sykora, New Richmond, WI (US)

(73) Assignee: 3M Innovative Properties Company, Saint Paul, MN (US)

( * ) Notice: Subject to any disclaimer, the term of this patent is extended or adjusted under 35 U.S.C. 154(b) by 876 days.

(21) Appl. No.: 12/969,995

(22) Filed: Dec. 16, 2010

(65) Prior Publication Data

US 2012/0154450 A1    Jun. 21, 2012

(51) Int. Cl.
| | |
|---|---|
| *G09G 3/36* | (2006.01) |
| *G02B 27/22* | (2006.01) |
| *H04N 13/04* | (2006.01) |
| *G09G 3/00* | (2006.01) |
| *F21V 8/00* | (2006.01) |
| *G02F 1/1335* | (2006.01) |

(52) U.S. Cl.
CPC ............ *G02B 27/2214* (2013.01); *G02B 27/22* (2013.01); *H04N 13/0404* (2013.01); *H04N 13/0418* (2013.01); *G09G 3/00* (2013.01); *G02B 6/0038* (2013.01); *G02B 6/0053* (2013.01); *G02B 6/0065* (2013.01); *G02F 1/133526* (2013.01); *G02F 1/133615* (2013.01)
USPC ........... 345/102; 345/211; 345/690; 362/613; 362/620; 362/625

(58) Field of Classification Search
USPC ......... 345/102, 211–213, 690–693; 362/97.1, 362/613, 620, 602, 612, 625–627
See application file for complete search history.

(56) References Cited

U.S. PATENT DOCUMENTS

| | | | | |
|---|---|---|---|---|
| 5,897,184 | A * | 4/1999 | Eichenlaub et al. | ............ 349/64 |
| 6,064,424 | A | 5/2000 | Van Berkel | |
| 7,210,836 | B2 | 5/2007 | Sasagawa | |
| 7,224,529 | B2 | 5/2007 | King | |
| 7,530,721 | B2 * | 5/2009 | Mi et al. | ........................ 362/606 |
| 2005/0052750 | A1 | 3/2005 | King | |
| 2005/0243551 | A1 * | 11/2005 | Onishi et al. | .................. 362/244 |
| 2005/0259323 | A1 | 11/2005 | Fukushima | |
| 2005/0276071 | A1 * | 12/2005 | Sasagawa et al. | ............. 362/607 |

(Continued)

FOREIGN PATENT DOCUMENTS

| | | |
|---|---|---|
| GB | 2415850 | 1/2006 |
| GB | 2458340 | 9/2009 |

(Continued)

*Primary Examiner* — Jennifer Nguyen

(57) ABSTRACT

Stereoscopic displays and backlights include a light guide with individually addressable light sources disposed at opposite edges of the light guide, and a light redirecting film disposed in front of the light guide. Light from one light source is emitted from the backlight as a right eye elongated light beam, and light from the opposite light source is emitted as a left eye elongated light beam. Structured surface features, e.g. linear prismatic or linear lenticular features, on the light guide and/or the light redirecting film are oriented such that the elongated light beams are offset from an optical axis of the backlight. Moreover, each of the elongated light beams is oriented to intersect both a first observation plane and a second observation plane perpendicular to the first observation plane, the first observation plane defined by the optical axis and an in-plane axis along which the light sources are disposed.

24 Claims, 18 Drawing Sheets

(56) References Cited

U.S. PATENT DOCUMENTS

| | | |
|---|---|---|
| 2008/0084518 A1* | 4/2008 | Brott et al. ............. 349/65 |
| 2008/0084519 A1 | 4/2008 | Brigham |
| 2008/0191966 A1 | 8/2008 | Van Berkel |
| 2009/0316058 A1 | 12/2009 | Huizinga |
| 2010/0259819 A1 | 10/2010 | Hiddink et al. |
| 2011/0149391 A1 | 6/2011 | Brott |
| 2011/0170184 A1 | 7/2011 | Wolk |
| 2012/0033443 A1* | 2/2012 | Aho et al. ............. 362/606 |

FOREIGN PATENT DOCUMENTS

| | | |
|---|---|---|
| JP | 2005-266293 | 9/2005 |
| JP | 2006-018282 | 1/2006 |
| WO | WO 2009-101558 | 8/2009 |

* cited by examiner

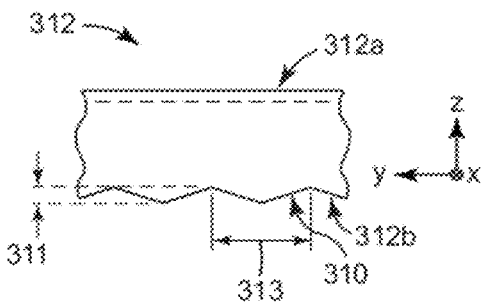
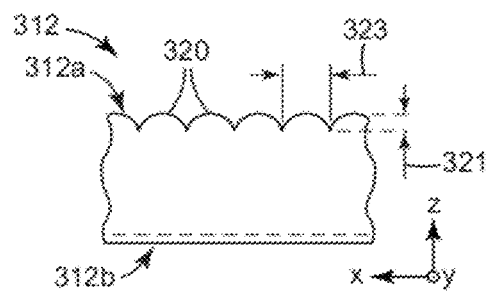
FIG. 3a  FIG. 3b
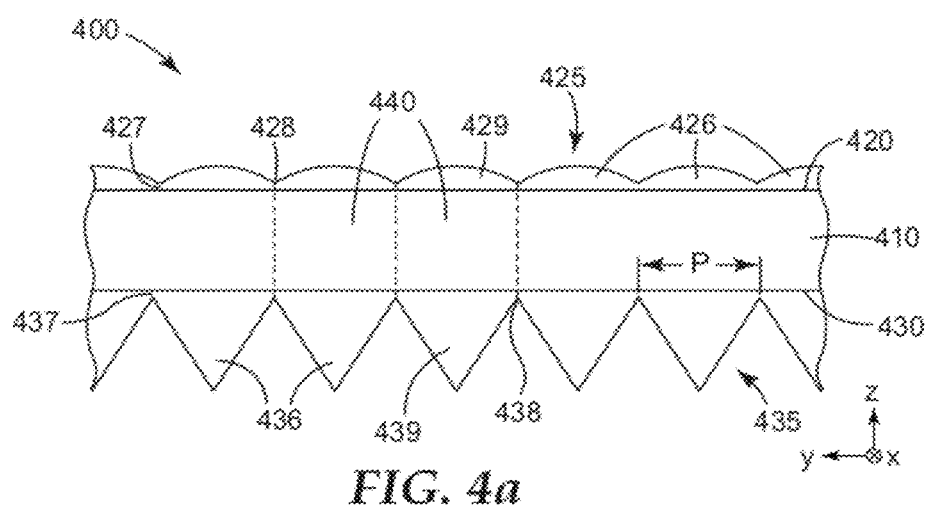
FIG. 4a
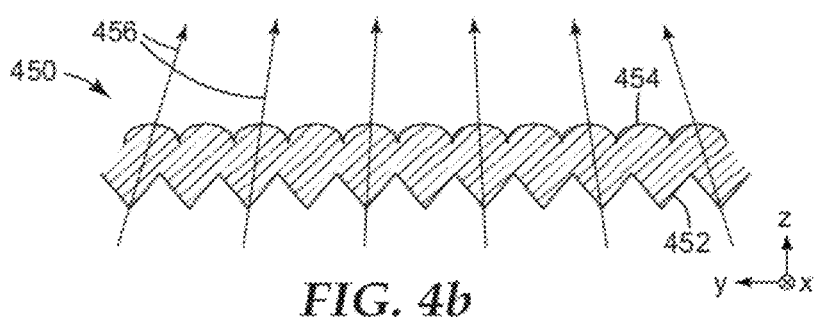
FIG. 4b

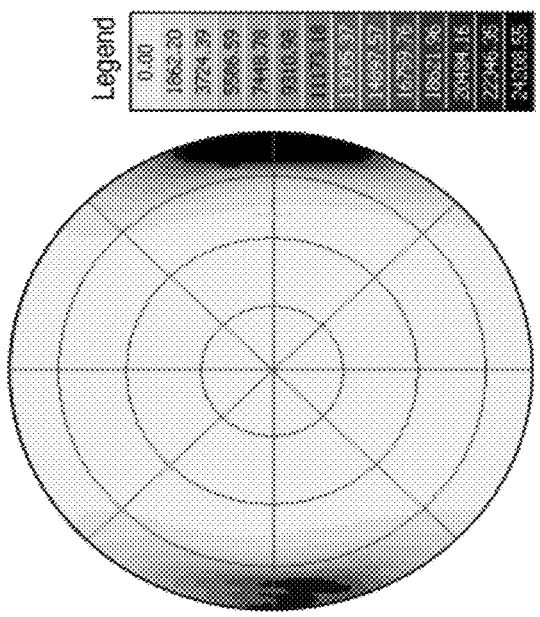
FIG. 8b-1
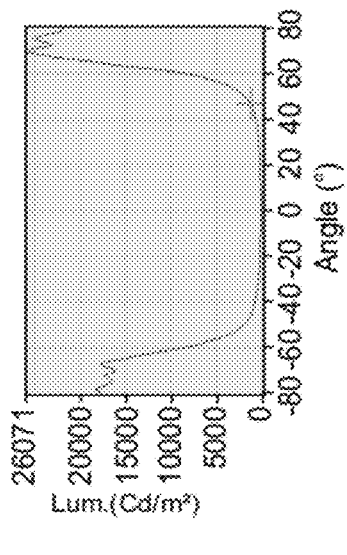
FIG. 8b-2
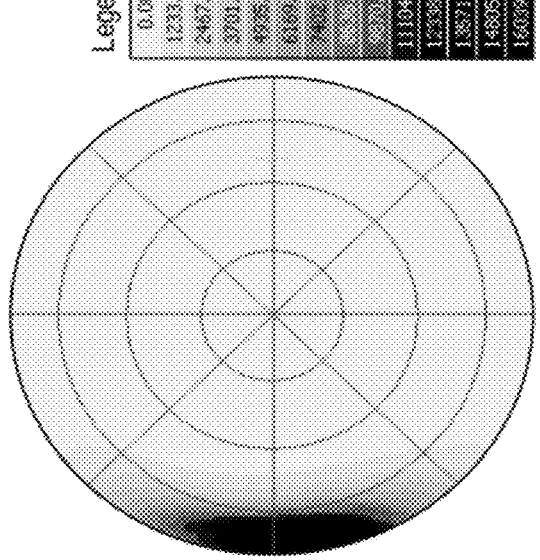
FIG. 8a-1
FIG. 8a-2

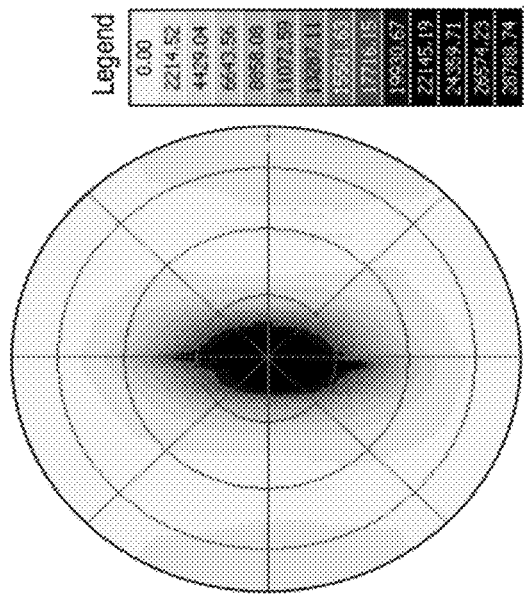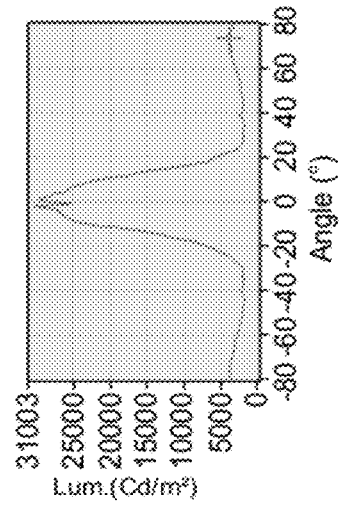
FIG. 9b-1  FIG. 9b-2
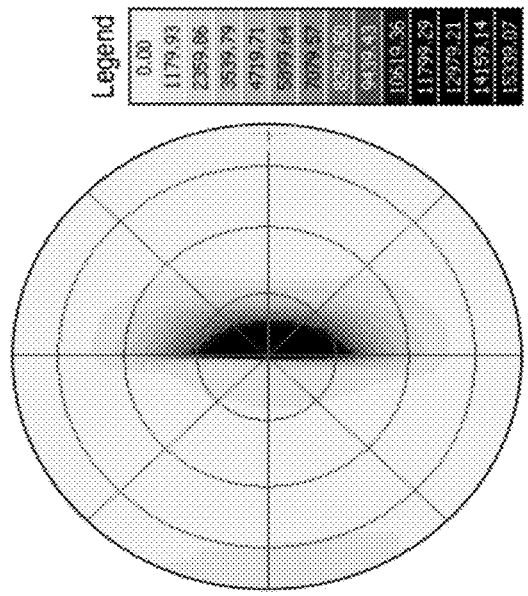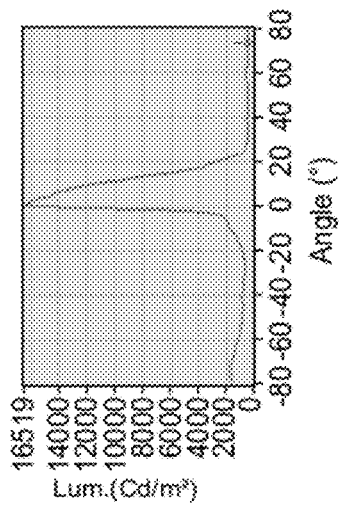
FIG. 9a-1  FIG. 9a-2

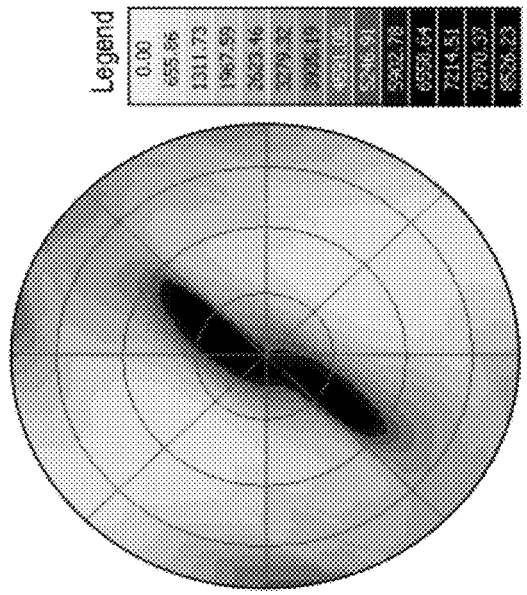 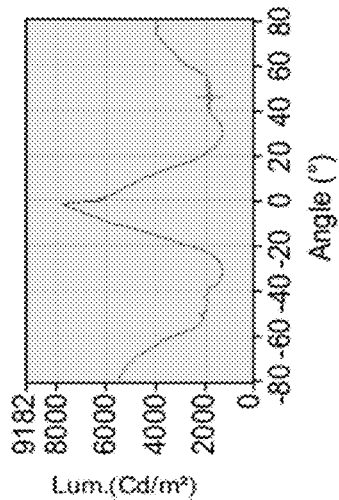
*FIG. 14b-1* *FIG. 14b-2*
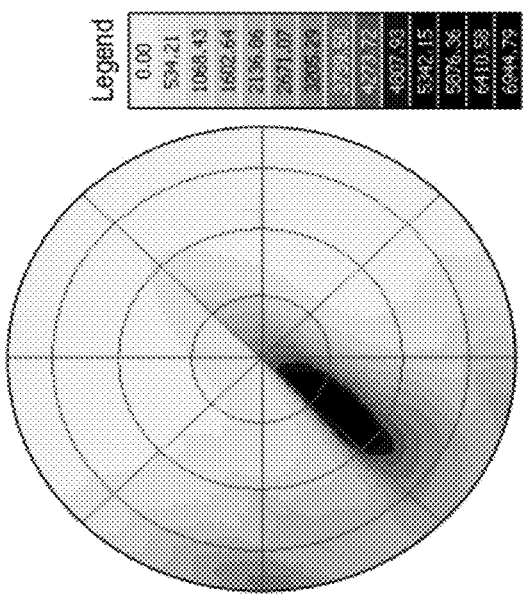 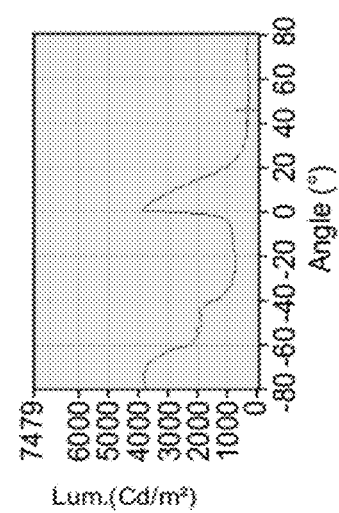
*FIG. 14a-1* *FIG. 14a-2*

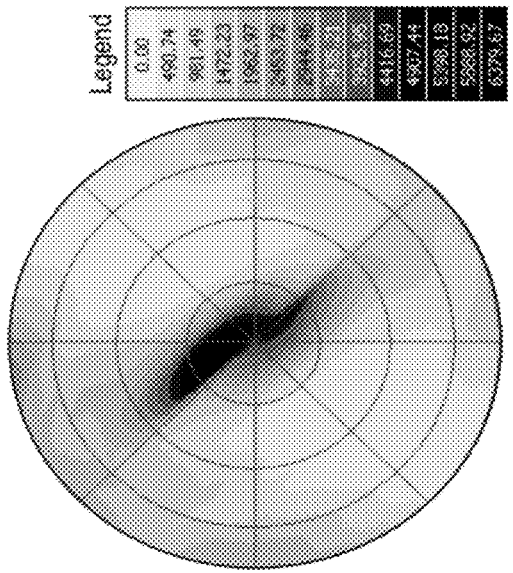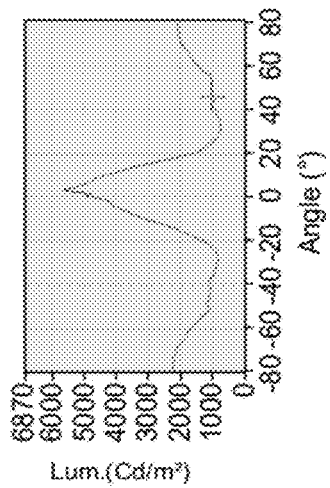
FIG. 15b-1  FIG. 15b-2
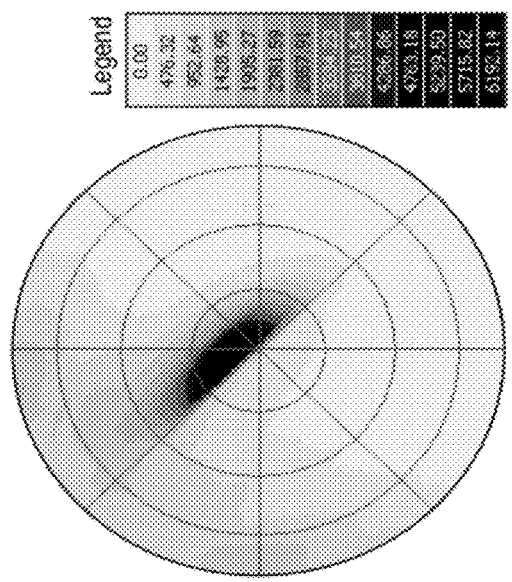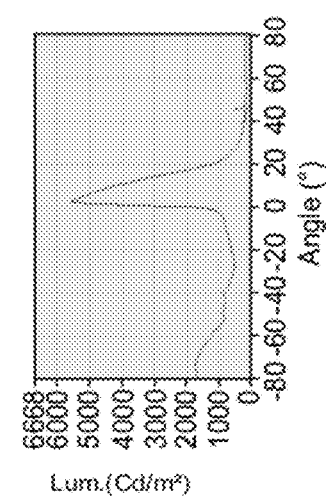
FIG. 15a-1  FIG. 15a-2

DUAL-ORIENTATION AUTOSTEREOSCOPIC BACKLIGHT AND DISPLAY

FIELD OF THE INVENTION

This invention relates generally to backlit displays, with particular application to such displays that present distinct left- and right-eye images to allow for stereoscopic viewing, and backlights therefor, and optical films and other components useable with such displays or backlights. The invention also relates to associated articles, systems, and methods.

BACKGROUND

A stereoscopic display usually presents an observer with images with parallax from individual right and left eye viewpoints. There are several techniques of providing the two eyes of the observer with the parallax images to produce a stereoscopic viewing experience. In a first technique, the observer utilizes a pair of shutter or 3-dimensional ("3D") glasses which transmit or block light from the viewer's eyes in synchronization with alternating the left/right image display. In a second technique, right eye and left eye images are alternatively displayed and directed towards the respective eyes of the observer but without the use of 3D glasses. This second technique is referred to as autostereoscopic, and is advantageous for 3D viewing because there is no need for the observer to wear any type of specialized glasses.

Autostereoscopic displays typically include a display panel, a specially designed backlight, and a specially designed light redirecting film disposed between the backlight and the display panel. The backlight provides a light guide having a light output area of nominally the same size as the display panel. Light sources disposed along opposite edges of the light guide are alternatively energized, causing the output area of the light guide to emit light alternatively at two different highly oblique angles. This light emitted by the light guide is intercepted by the light redirecting film (sometimes also referred to herein as 3D film), which converts the two different types of emitted light into alternating beams of light, one of which is directed to an observer's right eye and the other of which is directed to the observer's left eye. Placement of an electronically addressable display panel, such as an LCD panel, between the light redirecting film and the observer, and controlling the LCD panel to exhibit alternating right eye and left eye images in synchronization with the alternating light beams, allows the observer to perceive a 3-dimensional image.

BRIEF SUMMARY

Conventional autostereoscopic displays allow the user to perceive a stereoscopic (3D) image if the user is oriented in a particular way with respect to the display (e.g., with the display in a "landscape" or "portrait" orientation) but not if the user and/or display is rotated such that the user is in an orthogonal orientation (e.g., with the display in a portrait or landscape orientation, respectively).

We have developed new optical films, backlights, display systems, and components thereof that allow the user to perceive a stereoscopic image both when the user is oriented one way with respect to the display and when the user is in an orthogonal orientation. For example, the new films, backlights, and so forth can allow a user to perceive a stereoscopic image both when the display is in a "portrait" orientation relative to the user, and when the display is in a "landscape" orientation relative to the user.

The present application therefore discloses, inter alia, stereoscopic displays and backlights that include a light guide with individually addressable light sources disposed at opposite edges of the light guide, and a light redirecting film disposed in front of the light guide. Light from one light source is emitted from the backlight as a right eye elongated light beam, and light from the opposite light source is emitted as a left eye elongated light beam. The light beams are elongated according to their intensity distribution as a function of propagation direction, e.g. by plotting the intensity distribution in a spherical coordinate system defined by a polar angle and an azimuthal angle. Structured surface features, e.g. linear prismatic or linear lenticular features, on the light guide and/or the light redirecting film may be oriented in unconventional ways such that the elongated light beams are offset from an optical axis of the backlight. Moreover, each of the elongated light beams may be oriented to intersect both a first observation plane and a second observation plane perpendicular to the first observation plane, the first observation plane being defined by the optical axis and an in-plane axis along which the light sources are disposed.

The present application also discloses backlights suitable for use in autostereoscopic displays, in which the backlight may include a light guide and a light redirecting film disposed to receive light from the light guide. The light guide may have first and second side surfaces adapted to receive light from respective first and second light sources, the first and second side surfaces being disposed on opposite ends of a first in-plane axis of the light guide. The light guide may also have opposed first and second structured surfaces, the first structured surface including lenticular features that each extend parallel to an in-plane lenticular axis, and the second structured surface including prismatic features that each extend parallel to an in-plane prismatic axis. The in-plane lenticular axis may not be parallel to the first in-plane axis, or the in-plane prismatic axis may not be perpendicular to the first in-plane axis, or both.

In some cases, the in-plane lenticular axis may be disposed at an angle θ relative to the first in-plane axis, and θ may have a magnitude in a range from 23 to 67 degrees. In some cases, the magnitude of θ may be about 45 degrees. In some cases, the in-plane prismatic axis may be disposed at an angle θ relative to the first in-plane axis, and θ may have a magnitude in a range from 0 to 45 degrees, or θ may have a magnitude of about 0 degrees or about 45 degrees. In some cases, the in-plane lenticular axis may not be perpendicular to the in-plane prismatic axis, or the in-plane lenticular axis may be disposed at an angle θ relative to the in-plane prismatic axis, where θ may have a magnitude in a range from 45 to 81 degrees, or in a range from 65 to 70 degrees, or it may have a magnitude of about 45 degrees.

In some cases, the light redirecting film may have opposed third and fourth structured surfaces, the third structured surface including lenticular features that each extend parallel to a second in-plane lenticular axis, and the fourth structured surface including prismatic features that each extend parallel to a second in-plane prismatic axis. In some cases, the second in-plane lenticular axis may be parallel to the second in-plane prismatic axis, and the second in-plane lenticular axis may not be perpendicular to the first in-plane axis. In some cases, the second in-plane lenticular axis may be disposed at an angle θ relative to the first in-plane axis, and θ may have a magnitude in a range from 9 to 81 degrees, or in a range from 65 to 70 degrees, or it may have a magnitude of about 45 degrees. In some cases, the in-plane lenticular axis may be disposed at an angle in a range from 23 to 67 degrees relative to first in-plane axis, and the in-plane prismatic axis may be disposed at an angle in a range from 23 to 67 degrees relative to the first in-plane axis. In some cases, the in-plane lenticular axis may be perpendicular to the in-plane prismatic axis.

The present application also discloses autostereoscopic displays that include a backlight as described herein, a display disposed in front of the backlight, and a controller coupled to the backlight and to the display, the controller adapted to coordinate operation of the first and second light sources of the backlight with operation of the display.

The present application also discloses backlights that have an output area characterized by an optical axis and first and second orthogonal in-plane axes, the optical axis and the first in-plane axis defining a first observation plane, and the optical axis and the second in-plane axis defining a second observation plane orthogonal to the first observation plane. The backlight may include a first and second light source assembly disposed at opposite ends of the backlight along the first in-plane axis, the backlight being adapted to transmit light received from the first light source assembly into a first elongated light beam emitted from the output area, the first elongated light beam being offset from the optical axis and oriented to intersect both the first and second observation planes.

In some cases, the backlight may also be adapted to transmit light received from the second light source assembly into a second elongated light beam emitted from the output area, the second elongated light beam also being offset from the optical axis and oriented to intersect both the first and second observation planes. In some cases, the optical axis may lie between the first and second elongated light beams. In some cases, the first and second light beams may be oriented to allow a viewer to observe a stereoscopic image from a display panel disposed in front of the backlight, both when the viewer's eyes are disposed in the first observation plane and when the viewer's eyes are disposed in the second observation plane. In some cases, the backlight may include a light guide having first and second side surfaces adapted to receive light from the first and second light source assemblies respectively, the first and second side surfaces being disposed on opposite ends of the light guide along the first in-plane axis. The light guide may also have opposed first and second structured surfaces, the first structured surface including lenticular features that each extend parallel to an in-plane lenticular axis, and the second structured surface including prismatic features that each extend parallel to an in-plane prismatic axis. A light redirecting film may be disposed to receive light from the light guide. The in-plane lenticular axis may not be parallel to the first in-plane axis, or the in-plane prismatic axis may not be perpendicular to the first in-plane axis, or both.

The present application also discloses light redirecting films suitable for use in autostereoscopic backlights. The film may have mutually orthogonal in-plane major and minor axes. The film may also have opposed first and second structured surfaces, the first structured surface including lenticular features that each extend parallel to an in-plane lenticular axis, and the second structured surface including prismatic features that each extend parallel to an in-plane prismatic axis. At least one of the in-plane lenticular axis and the in-plane prismatic axis may be perpendicular to neither the major axis nor the minor axis.

In some cases, the in-plane lenticular axis may be parallel to the in-plane prismatic axis. In some cases, the in-plane lenticular axis may be disposed at an angle $\theta$ relative to the major axis, and $\theta$ may have a magnitude in a range from 9 to 81 degrees, or may have a magnitude of about 45 degrees. The present application also discloses autostereoscopic backlights and displays that include any of the disclosed light redirecting films.

Related methods, systems, and articles are also discussed.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF DRAWINGS

FIGS. 3a and 3b show schematic side views of the light guide of FIG. 3;

FIG. 4a is a schematic cross-sectional view of a light redirecting film;

FIG. 4b is a schematic cross-sectional view of another light redirecting film;

FIG. 6a is a schematic conoscopic graph of typical light beams generated by the autostereoscopic backlight depicted in FIG. 5a;

FIG. 6b is a schematic conoscopic graph of light beams that may be generated by a modified autostereoscopic backlight in which one or more structured surface features have been reoriented relative to FIG. 5a;

FIG. 8a-1 is a conoscopic plot, and FIG. 8a-2 is a corresponding intensity graph along the horizontal axis of FIG. 8a-1, of a light beam produced by a light guide when a light source assembly on one side of the light guide is energized, and FIG. 8b-1 is a conoscopic plot, and FIG. 8b-2 is a corresponding intensity graph along the horizontal axis of FIG. 8b-1, of the light beam of FIG. 8a-1 together with a second light beam produced by the light guide when a second light source assembly, on the opposite side of the light guide, is also energized;

FIGS. 9a-1 and 9b-1, 10a-1 and 10b-1, 11a-1 and 11b-1, 12a-1 and 12b-1, 13a-1 and 13b-1, 14a-1 and 14b-1, 15a-1 and 15b-1, and 16a-1 and 16b-1 are pairs of conoscopic plots analogous to those of FIGS. 8a-1 and 8b-1, respectively, but for different autostereoscopic light guide or backlight configurations; and FIG. 9a-2 is an intensity graph along the horizontal axis of FIG. 9a-1, FIG. 9b-2 is an intensity graph along the horizontal axis of FIG. 9b-1, and so forth for FIGS. 10a-2, 10b-2, 11a-2, 11b-2, 12a-2, 12b-2, 13a-2, 13b-2, 14a-2, 14b-2, 15a-2, 15b-2, 16a-2, and 16b-2. In the figures, like reference numerals designate like elements.

DETAILED DESCRIPTION OF ILLUSTRATIVE EMBODIMENTS

We begin by describing autostereoscopic systems and articles (see e.g. FIGS. 1a through 4b) without discussing the design modifications that can be used to provide dual orientation stereoscopic viewing, such as autostereoscopic viewing in both portrait and landscape orientations. Such modifications are disclosed later in this detailed description section, beginning with the description of FIGS. 5a-d. The reader will understand that any or all of the design features discussed in connection with FIGS. 1a through 4b can be used in combination with one or more of the modifications discussed elsewhere herein for providing autostereoscopic viewing in orthogonal orientations. Moreover, the reader will understand that this application contemplates that any of the design features of any given embodiment described herein can be combined with any design features of any other embodiment described herein.

Figure 1A:
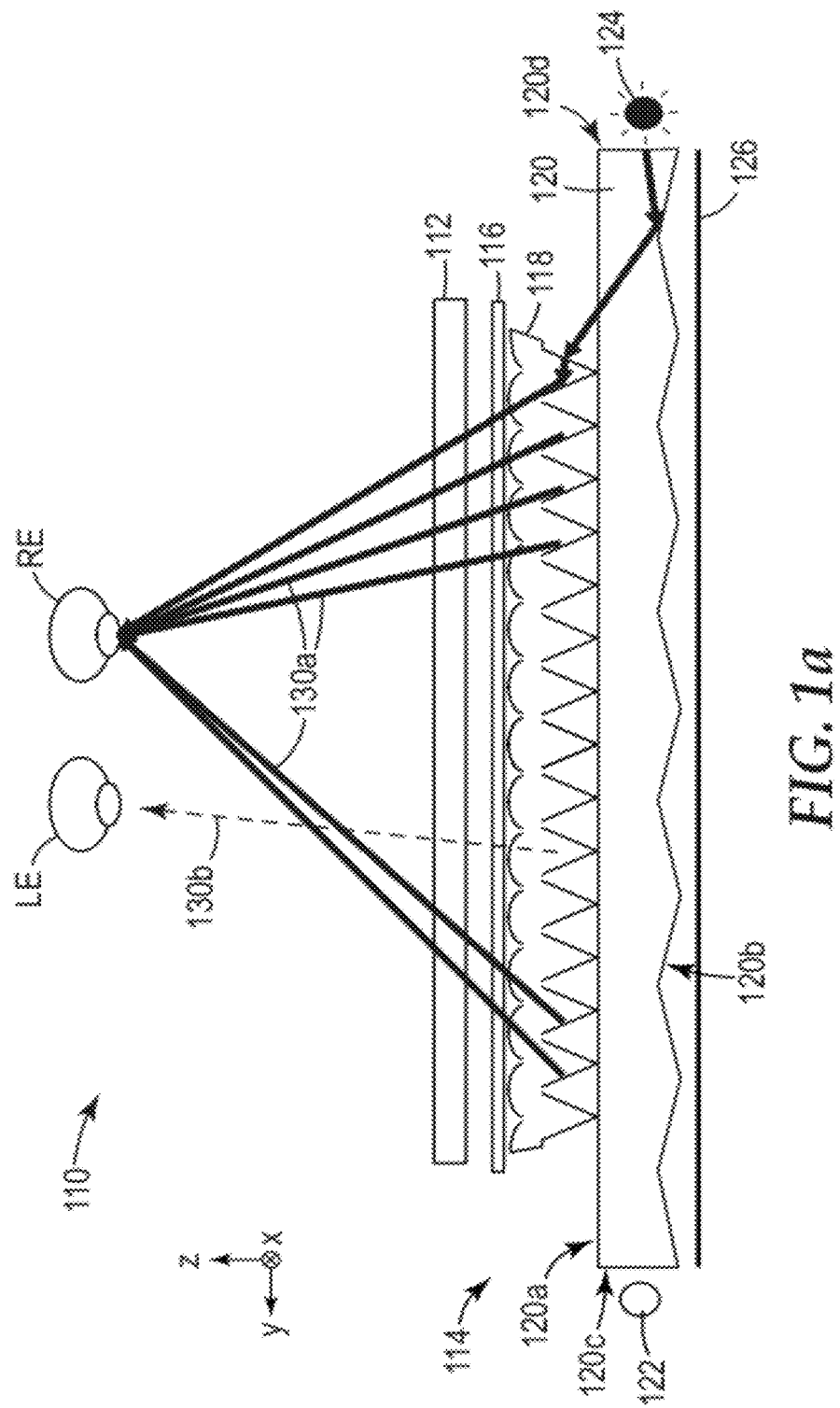
FIGS. 1a and 1b are schematic side views of a 3D autostereoscopic display device including a backlight, the display device capable of presenting different images to the right and left eyes.
Figure 1B:
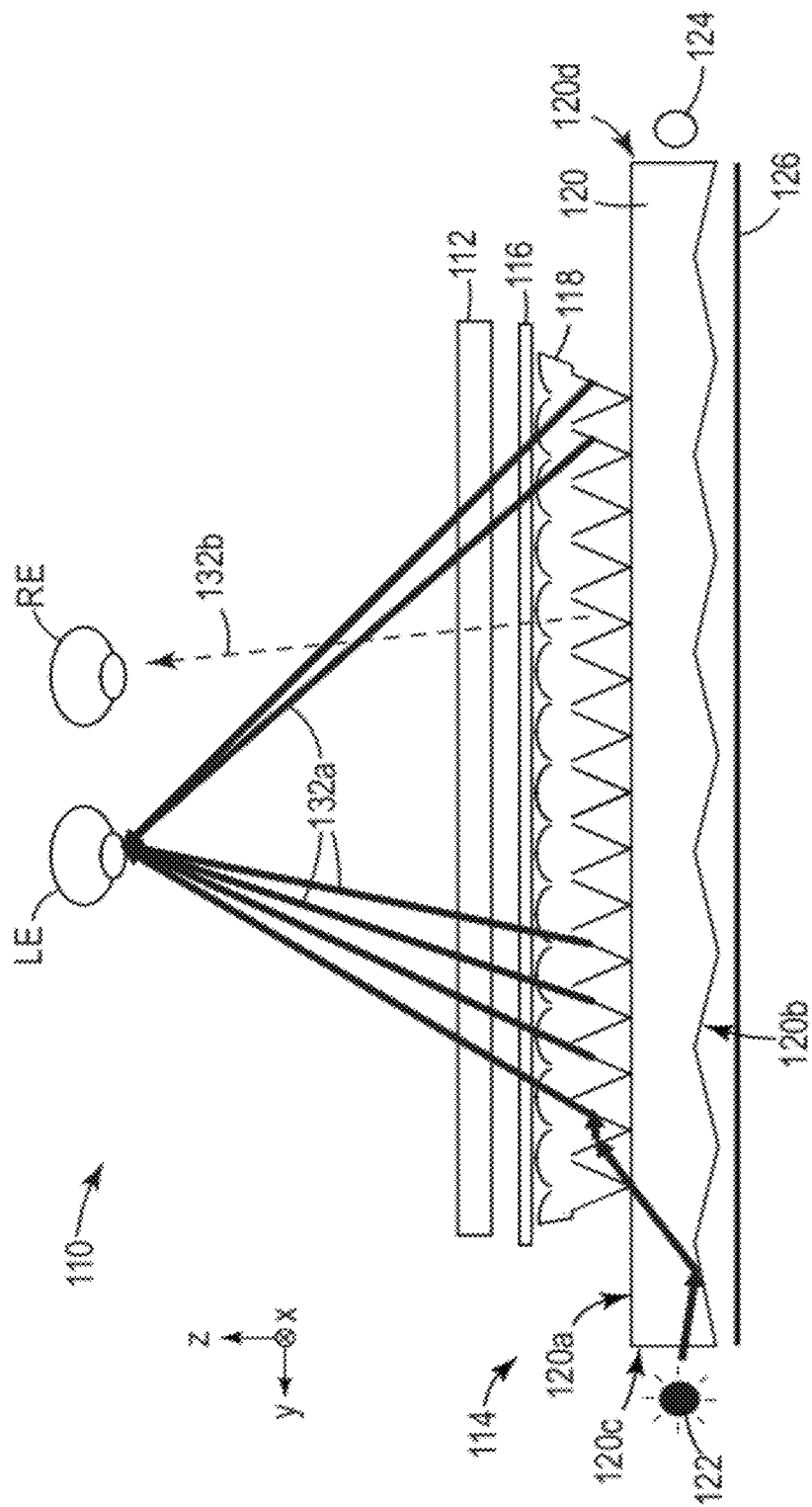

Turning then to FIGS. 1a and 1b, we see depicted some typical components of, as well as the basic operation of, a backlit autostereoscopic 3D display 110. In short, an observer having a left eye LE and a right eye RE views the display 110, and, by virtue of its construction and operation, perceives a 3-dimensional image. The display is depicted in the context of a Cartesian x-y-z coordinate system for ease of description, but the reader will understand that this does not limit the present disclosure to nominally planar displays, backlights, or light guides, for example.

The display 110 includes a liquid crystal panel 112 having individual pixels arranged in a matrix that defines an active or working area of the panel, the pixels being individually addressable by a controller (not shown). The controller sends control signals to the panel 112 to form any desired image, preferably in a colored or RGB (red-green-blue) sub-pixel format, in the active area of the panel 112. The display 110 is provided with a backlight, shown generally at 114, to make the image noticeable to the observer. The backlight 114 may be considered to include a polarizer 116, a 3D light redirecting film 118, a light guide 120, first and second light source assemblies 122, 124, respectively, and a back reflector 126. Some of these components, e.g. the back reflector 126 and/or the polarizer 116, may be omitted depending upon system requirements and design details, and other light management films or components, such as polarizing films (including reflective polarizing films), mirror films, diffusing films, multilayer optical films, window films, retarder films, prismatic brightness enhancement films, and other microstructured or non-microstructured films, may be added to the system as deemed appropriate by the system designer. Further, some components, such as the polarizer 116 and/or the redirecting film 118, may be considered to be part of the panel 112 rather than part of the backlight 114, or may be considered to be neither part of the backlight 114, nor part of the panel 112.

The light guide 120 is a key part of the backlight 114. The light guide has first and second major surfaces 120a, 120b, and first and second side surfaces 120c, 120d, as shown. The light guide receives light via the side surfaces 120c, 120d from the light source assemblies 122, 124, preferably in a sequential or alternating fashion, and causes the light from each of those assemblies to spread out, via multiple reflections, over an extended area of the light guide corresponding at least to a working area of the panel 112. As light from a given light source assembly traverses the length of the light guide, some of the light is extracted from the front or top surface (major surface 120a) of the light guide. This extracted light is typically highly oblique, e.g., peaking in luminance at about 70 degrees from the normal direction (z-axis) as measured in air, or having a peak luminance in a typical range from 50 to greater than 80 degrees, or from 60 to greater than 80 degrees. This highly oblique light is intercepted by the redirecting film 118, which is microstructured in such a way as to redirect the highly oblique light exiting the light guide 120 so that it is directed closer to the optical axis of the system, i.e., closer to the z-axis.

Due to the design of the light guide 120, light originating from the assembly 124 exits the surface 120a of the light guide at a highly oblique angle in a leftward-direction (closer to the +y direction) from the perspective of FIGS. 1a and 1b, while light originating from assembly 122 exits the surface 120a at a highly oblique angle in a rightward-direction (closer to the −y direction) from the same perspective. The redirecting film 118 is designed to redirect the oblique light originating from the assembly 124 in directions generally corresponding to light rays 130a, i.e., towards a right eye RE of the observer. The redirecting film 118 likewise redirects the oblique light originating from the assembly 122 in directions generally corresponding to light rays 132a, i.e., towards a left eye LE of the observer.

FIGS. 1a and 1b depict the display 110 at two different points in time. In FIG. 1a, light source assembly 124 is energized (turned "on") and light source assembly 122 is not (i.e. it is turned "off"), and in FIG. 1b, light source assembly 122 is energized and light source assembly 124 is not. The display is preferably controlled to alternate between these two illumination states. In synchrony with that alternating illumination, the controller causes the panel 112 to display a right-eye image when assembly 124 is energized, and a left-eye image when assembly 122 is energized. Rapid synchronous switching, e.g., switching frequencies of at least 90 Hz, or 100 Hz, or 110 Hz, or 120 Hz or more, between the right-eye image (and the assembly 124) and the left-eye image (and the assembly 122) allows the observer to perceive a stable 3D video image without requiring the observer to wear any special eyewear.

In the operation of the display 110, crosstalk occurs when light from the backlight reaches the left eye LE while the right-eye image is being displayed, and/or when light from the backlight reaches the right eye RE while the left-eye image is being displayed. Such crosstalk, which degrades the 3D viewing experience, is depicted by light ray 130b in FIG. 1a, and by light ray 132b in FIG. 1b.

Exemplary light guides are composed of a suitable light-transmissive material such as a polymer or glass. The light guide may be relatively rigid or flexible, and it may be relatively thin (e.g. in the form of a film) or thick. The light guide may have a substantially rectangular shape in plan view (see e.g. FIGS. 5a, 5b, and 5c), but non-rectangular shapes may also be used. A back or rear major surface (see surface 120b in FIGS. 1a and 1b) of the light guide is preferably shaped to include a plurality of extraction elements; features such as linear lenticular features, or linear prism features are useful. In cases where linear prisms are used for the rear major surface, each of the linear prisms may extend in a direction parallel to the side surfaces 120c, 120d, i.e., parallel to the x-axis shown in the figure, although other orientations are also contemplated as discussed further below. The linear prism features cause the back major surface (see surface 120b) to substantially redirect (e.g., reflect, extract, and the like) light, while the front major surface (see surface 120a)

substantially transmits light. In some cases, a highly reflective surface on or adjacent the back major surface helps to redirect light out of the backlight through the front major surface. The front major surface may be substantially flat, but is preferably structured with light spreading elements such as lenticular, prismatic, or similar features that spread the light in the vertical direction, i.e., in the x-z plane of FIG. 2. Further design details regarding light guides suitable for use in autostereoscopic backlights can be found in U.S. Pat. No. 7,210,836 (Sasagawa et al.), and U.S. Patent Application Publication US 2009/0316058 (Huizing a et al.). Reference is also made to U.S. Patent Application Publication US 2008/0084519 (Brigham et al.). All three of these patent documents are incorporated herein by reference in their entireties.

Exemplary redirecting films have structured or faceted features on both major surfaces of the film. The front major surface, which faces the observer, may comprise linear lenticular features. The back major surface, which faces the light guide, may comprise linear prismatic features. The linear prismatic features are preferably parallel to each other, and they may be parallel to the linear lenticular features on the front surface of the film, although other orientations are also possible. In some cases, the redirecting film may be oriented such that the linear lenticular and prismatic features of the redirecting film are parallel to the prismatic features on the back major surface of the light guide, but alternative orientations have been found to be beneficial and are discussed elsewhere herein. The lenticular and prismatic features of the redirecting film are designed such that the highly oblique light emitted by the front major surface of the light guide is converted to more axially-directed light emitted at the proper angles such that an observer can perceive depth in the displayed image. Further design details of exemplary redirecting films can be found in one or more of the following documents: U.S. Pat. No. 7,210,836 (Sasagawa et al.), and U.S. Patent Application Publications US 2005/0052750 (King et al.), US 2008/0084519 (Brigham et al.), and US 2009/0316058 (Huizing a et al.), all of which are incorporated herein by reference in their entireties.

Figure 2:
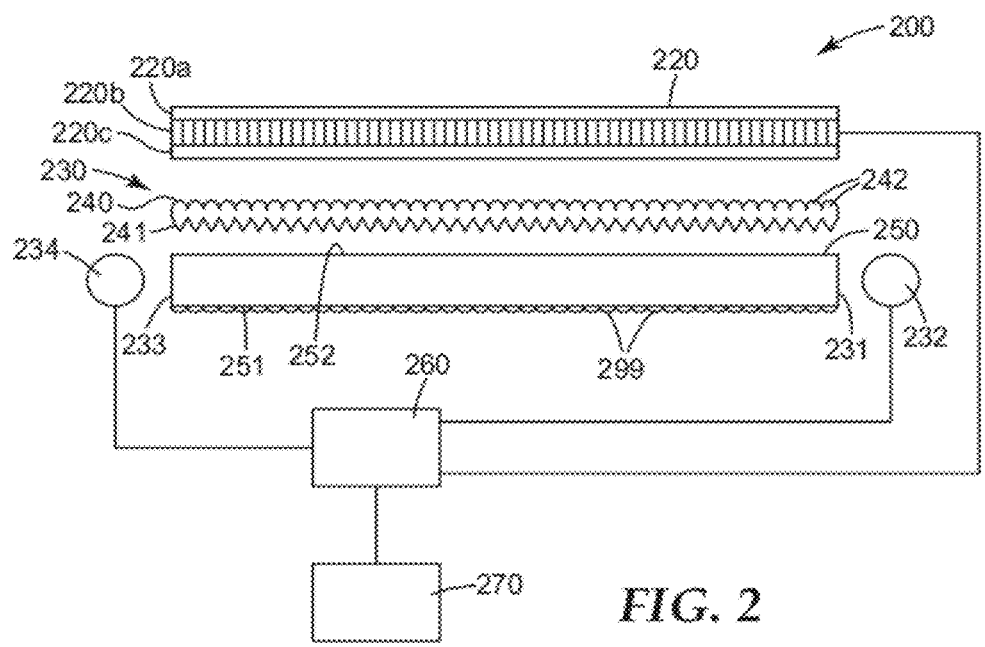
FIG. 2 is a schematic side view of an illustrative autostereoscopic display apparatus.

Another autostereoscopic display 200 is shown in FIG. 2. The display 200 includes a display panel 220, e.g., a liquid crystal display (LCD) panel, and a backlight 230 positioned to provide light to the liquid crystal display panel 220. The display panel 220 is shown as including an interior pixelated layer 220b of liquid crystal material sandwiched between two panels or plates 220a, 220c. The backlight 230 includes one or more light guides 250, one or more right eye image light sources 232, e.g., solid state light sources, and one or more left eye image light sources 234, e.g., solid state light sources. Each of the first and second light sources 232, 234 is capable of repetitively transitioning between an OFF state, during which the light source 232, 234 produces no light output or a very small light output, and an ON state, during which the light source 232, 234 produces a significant light output, at a rate that is imperceptible to the human eye, for example, at a rate of at least 30 Hz per eye or preferably at least 60 Hz per eye.

The light sources 232, 234 may be inorganic solid state light sources, e.g., light emitting diodes (LEDs) or laser diodes, and/or may be organic light emitting diodes (OLEDs). Light extraction features 299, e.g., prisms, lenticular features, white dots, haze coatings and/or other features, may be disposed on one or both surfaces 251, 252 of the light guide 250. A double-sided light redirecting optical film 240, as described in more detail herein, is disposed between the liquid crystal display panel 220 and the light guide 250. The double-sided optical film 240 includes lenses 242 (linear lenticular structures) on the surface of the optical film 240 that is oriented away from the light guide 250. Each of the lenses 242 is registered to a corresponding prism 241 (linear prismatic structure) on the surface of the optical film 240 that is oriented toward the light guide 250. In general, dimensions for the pitch of the lenses and prisms may be determined, for example, by selecting a pitch that would result in the elimination or reduction of Moiré patterns in the display 200. The lens and prism pitches can also be determined based upon manufacturability. As LCD panels are manufactured with different pixel pitches, it can be desirable to change the pitch of the optical film to accommodate the different pixel pitches of the LCD panel. A useful pitch range for an autostereoscopic light redirecting optical film 240 is about 10 microns to about 140 microns, for example.

The display 200 can have any useful shape or configuration. In many embodiments, the liquid crystal display panel 220 and/or light guide 250 have a square or rectangular shape. However, in some embodiments, the liquid crystal display panel 220 and/or the light guide 250 may have more than four sides and/or have a curved shape. The surfaces 251, 252 of the light guide 250 may be substantially parallel, or the light guide 250 may be wedge-shaped. In some cases, two wedge-shaped light guides with corresponding light sources may be used.

A synchronization driving element 260 is electrically connected to the right eye image and left eye image light sources 232, 234, and the liquid crystal display panel 220. The synchronization driving element 260 synchronizes activation and deactivation of the right eye image light source 232 and the left eye image light source 234 as image frames are provided to the liquid crystal display panel 220 to produce an image. The image may be a still image sequence, video stream, and/or rendered computer graphics, for example. An image source 270 is connected to the synchronization driving element 260 and provides the image frames (e.g., right eye images and left eye images) to the liquid crystal display panel 220.

The liquid crystal display panel 220 can be any useful transmissive liquid crystal display panel. In many embodiments, liquid crystal display panel 220 has a frame response time of less than 16 milliseconds, or less than 10 milliseconds, or less than 5 milliseconds, or less than 3 milliseconds. Commercially available transmissive liquid crystal display panels having an appropriate frame response time include, for example, the Toshiba Matsushita Display (TMD) optically compensated bend (OCB) mode panel LTA090A220F (Toshiba Matsushita Display Technology Co., Ltd., Japan).

The light guide 250 includes a first light input side 231 adjacent the right eye image light source 232 and an opposing second light input side 233 adjacent the left eye image light source 234. A first light guide surface 251 extends between the first side 231 and second side 233. A second light guide surface 252, opposite the first surface 251, extends between the first side 231 and the second side 233. Light may be reflected or emitted from either surface 251, 252 of the light guide 250, but in general light is emitted from surface 252 and is reflected from surface 251. In many embodiments, a highly reflective surface is on or adjacent the first surface 251 to assist in re-directing light out through the second surface 252.

In some embodiments, the first light guide surface 251 includes a plurality of extraction elements 299 such as, prisms, lenticular features, white dots, haze coatings, and/or other features. The longitudinal axis of the extraction features can extend in a direction substantially parallel to the first side 231 and second side 233 or substantially parallel to the prisms and lenses of the double sided optical film 240, or the extraction features can be arranged at other angles.

The light sources 232, 234 can be any useful light source wherein the light output of each light source 232, 234 can be modulated from ON (relatively high light output) to OFF (no or negligible light output) at a rate of at least 30 Hz per eye or preferably 60 Hz or more per eye, for example. In many embodiments, the light sources 232, 234 are a plurality of LEDs, such as Nichia NSSWO20B (Nichia Chemical Industries, Ltd., Japan). In some embodiments, the light sources 232, 234 comprise a plurality of laser diodes or OLEDs. The light sources 232, 234 can emit any number of visible light wavelengths such as red, blue, and/or green, or range or combinations of wavelengths to produce, for example, white light.

The light guide 250 can be a single layer of optically clear material with light sources adjacent both sides of the light guide 250, or two (or more) layers of optically clear material which preferentially extract light in a desired direction, with a light source for each layer.

The image source 270 can be any useful image source capable of providing images frames (e.g., right eye images and left eye images) such as, for example, a video source or a computer rendered graphic source. In many embodiments, the video source can provide image frames from 50 to 60 hertz or from 100 to 120 hertz or greater.

The computer rendered graphic source can provide gaming content, medical imaging content, computer aided design content, and the like. The computer rendered graphic source can include a graphics processing unit such as, for example, an Nvidia FX5200 graphics card, a Nvidia GeForce 9750 GTX graphics card or, for mobile solutions such as laptop computers, an Nvidia GeForce GO 7900 GS graphics card. The computer rendered graphic source can also incorporate appropriate stereo driver software such as, for example, OpenGL, DirectX, or Nvidia proprietary 3D stereo drivers.

The image source 270 can provide video content. The image source can include a graphics processing unit such as, for example, an Nvidia Quadro FX1400 graphics card. The video source can also incorporate appropriate stereo driver software such as, for example, OpenGL, DirectX, or Nvidia proprietary 3D stereo drivers.

The synchronization driving element 260 can include any useful driving element providing synchronizing activation and deactivation (i.e., light output modulation) of the right eye image light source 232 and the left eye image light source 234 with image frames provided at a rate of, for example, 30 Hz or preferably 60 hertz or greater to the liquid crystal display panel 220 to produce video or rendered computer graphics. The synchronization driving element 260 can include a video interface such as, for example, a Westar VP-7 video adaptor (Westar Display Technologies, Inc., St. Charles, Mo.) coupled to custom light source drive electronics.

Figure 3:
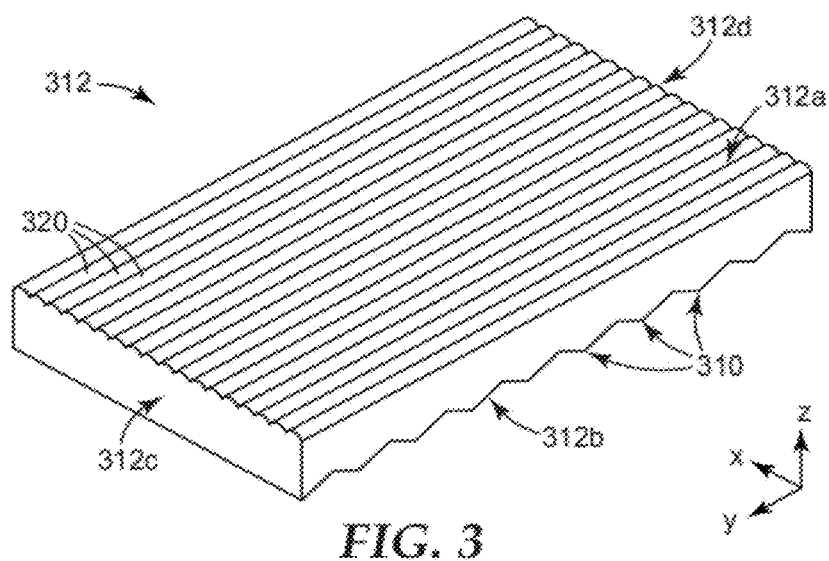
FIG. 3 is a schematic perspective view of a light guide, which view shows in exaggerated fashion exemplary surface structure on the two major surfaces of the light guide.

FIG. 3 shows a schematic perspective view of an exemplary light guide 312 that may be suitable for use in some of the disclosed backlights. The figure shows in exaggerated fashion exemplary surface structure on the two major surfaces of the light guide 312, but other orientations of the structured surface(s) relative to the edges or boundaries of the light guide can be beneficial and are discussed elsewhere herein. Schematic side views of the light guide are shown in FIGS. 3a and 3b. The light guide 312 includes a first major surface 312a from which light is extracted towards a display panel and/or observer, a second major surface 312b opposite the first major surface, and side surfaces 312c, 312d which may serve as light injection surfaces for left-beam-emitting and right-beam-emitting partially collimated light sources as discussed elsewhere herein. For example, one light source assembly may be positioned along the side surface 312c to provide a left eye beam emitted from the light guide 312, and a similar assembly can be positioned along the side surface 312d to provide a right eye beam emitted from the light guide 312.

The rear major surface 312b of the light guide is preferably machined, molded, or otherwise formed to provide a linear array of prism structures 310 shown best in FIG. 3a. These prism structures are designed to reflect an appropriate portion of the light propagating along the length of the light guide so that the reflected light can refract out of the front major surface 312a into air and onward to the display panel and/or observer, with one or more intervening light management films such as prismatic light redirecting film, and so that such reflected light is extracted from the front major surface relatively uniformly along the length of the light guide. The surface 312b may be coated with a reflective film such as aluminum, or it may have no such reflective coating. In the absence of any such reflective coating, a separate back reflector may be provided proximate the surface 312b to reflect any downward-propagating light that passes through the light guide so that such light is reflected back into and through the light guide. Preferably, the prism structures have a depth 311 that is shallow relative to the overall thickness of the light guide, and a width 313 that is small relative to the length of the light guide. The light guide may be made of any transparent optical material, preferably with low scattering such as an acrylic polymer, e.g., Spartech Polycast material. In one exemplary embodiment, the light guide may be made of acrylic material, such as cell-cast acrylic, and may have an overall thickness of 1.4 mm and a length of 140 mm along the y-axis, and the prisms may have a depth 311 of 2.9 micrometers and a width 313 of 81.6 micrometers, corresponding to a prism apex angle of about 172 degrees. The reader will understand that these values are merely exemplary, and should not be construed as limiting.

The front major surface 312a of the light guide is preferably machined, molded, or otherwise formed to provide a linear array of lenticular structures 320 that are parallel to each other and to an in-plane lenticular axis, such as the y-axis. On the other hand, the prism structures 310 may be parallel to each other and to an in-plane prismatic axis, such as the x-axis, along which the prism structures 310 extend. The lenticular structures may be shaped and oriented to enhance angular spreading along the x-axis for light that passes out of the light guide through the front major surface, and, if desired, to limit spatial spreading along the x-axis for light that remains in the light guide by reflection from the front major surface. In some cases, the lenticular structures 320 may have a depth 321 that is shallow relative to the overall thickness of the light guide, and a width 323 that is small relative to the width of the light guide. In some cases, the lenticular structures may be relatively strongly curved, as shown in FIG. 3b, while in other cases they may be more weakly curved. In one embodiment, the light guide may be made of cell-cast acrylic and may have an overall thickness of 0.76 mm, a length of 141 mm along the y-axis, and a width of 66 mm along the x-axis, and the lenticular structures 320 may have a radius of 35.6 micrometers, a depth 321 of 32.8 micrometers, and a width 323 of 72.6 mm, for example. In this embodiment, the prism structures 310 may have a depth 311 of 2.9 micrometers, a width 313 of 81.6 micrometers, and a prism apex angle of about 172 degrees. Again, the reader will understand that these values are merely exemplary, and should not be construed as limiting.

In FIG. 4a, an exemplary 3D light redirecting film 400 for use in autostereoscopic display systems is shown. The film 400 includes a web 410 substrate having opposed first and second surfaces 420, 430. First and second surfaces 420, 430 include first and second microreplicated structures 425, 435, respectively. First microreplicated structure 425 includes a plurality of arcuate features 426, which in the embodiment shown are cylindrical lenses with an effective diameter of about 142 microns, although other diameters may also be used. Second microreplicated structure 435 includes a plurality of saw-tooth or pyramidal prismatic features 436.

In the depicted example, first and second features 426, 436 have the same pitch or period of repetition P, e.g., the period of the first feature may be about 150 microns, and the period of repetition of the second feature may be the same. Typically, the ratio of the period of the first and second features is a whole number ratio (or the inverse), though other combinations are permissible. The features shown are of indefinite length in a down-web direction.

In the depicted example, opposed microreplicated features 426, 436 cooperate to form a plurality of lens features 440. In the example embodiment shown, the lens features 440 are lenticular lenses. Since the performance of each lens feature 440 is a function of the alignment of the opposed features 429, 439 forming each lens, precision alignment or registration of the lens features may be preferred.

Optionally, the film 400 may also include first and second land areas 427, 437. The land area is defined as the material between the substrate surfaces 420, 430 and the bottom of each respective feature, i.e., valleys 428, 438. The first land area 428 may be at least about 10 microns on the lens side and the second land area 438 may be about at least about 25 microns on the prism side. The land area assists in the features having good adherence to the web and may also aid in replication fidelity.

The film 400 may be made using an apparatus and method for producing precisely aligned microreplicated structures on opposed surfaces of the web, the apparatus and methods which are described in detail in U.S. Pat. No. 7,224,529 (King et al.). One embodiment of the film 400 was made using a web made from polyethylene terephthalate (PET), 0.0049 inches thick. Other web materials can also be used, e.g., polycarbonate.

In FIG. 4b, another 3D light redirecting film 450 suitable for use in autostereoscopic display systems is shown. A group of cylindrical lenses 454 is formed on one side of the film 450, and a group of triangular-like prisms 452 is formed on the other side. In this embodiment, the center-to-center spacing or pitch of the prisms 452 is deliberately made to be greater than the pitch of the cylindrical lenses, such that center lines 456 drawn from the apex of each prism to a core of each corresponding cylindrical lens gather or intersect at a specified region of space above the film 450. For example, the specified region may be a region 20 to 100 cm above or of front of the center section of the film 450 or associated display. Further details of light redirecting films as depicted in FIG. 4a can be found in Japanese Publication JP 2005-266293 (Akimasa et al.)

Still other 3D light redirecting film designs are described in commonly assigned patent application publication US 2011/0149391 (Brott et al.) and incorporated herein by reference in its entirety. This application discloses, among other things, double-sided optical films that include so-called "a-cylindrical" lenses disposed on a first surface of the optical film, and prisms disposed on a second surface of the optical film, wherein each lens on the first surface is registered to a prism on the second surface. The application also discloses double-sided optical films that include lenses disposed on a first surface of the optical film, and prisms disposed on a second surface of the optical film, wherein a rotation of the lenses on the first surface varies with position on the first surface and each lens on the first surface is registered to a prism on the second surface.

In some cases, the 3D light redirecting films disclosed herein, and/or displays or backlights or components thereof, may incorporate at least one nanovoided layer. The nanovoided layer may include a plurality of interconnected voids or a network of voids dispersed in a binder. At least some of the voids in the plurality or network may be connected to one another via hollow tunnels or hollow tunnel-like passages. The voids may occupy a sufficiently large fraction of the volume of the layer, but are individually of a small enough size, so that the nanovoided layer behaves optically like a material of very low refractive index, e.g., less than 1.35 or less than 1.3. In some cases, the nanovoided layer may exhibit a refractive index in a range from 1.15 to 1.35, or from 1.15 to 1.3, for example. The nanovoided layer may have at least one major surface that is microstructured, i.e., deliberately tailored to have a non-smooth or non-flat surface with relief features that have at least one dimension that is less than 1 millimeter, and in some cases the at least one dimension may be in a range from 50 nanometers to 500 micrometers. Reference is made to patent application publication US 2011/0170184 (Wolk), which is incorporated herein by reference in its entirety.

Figure 5A:
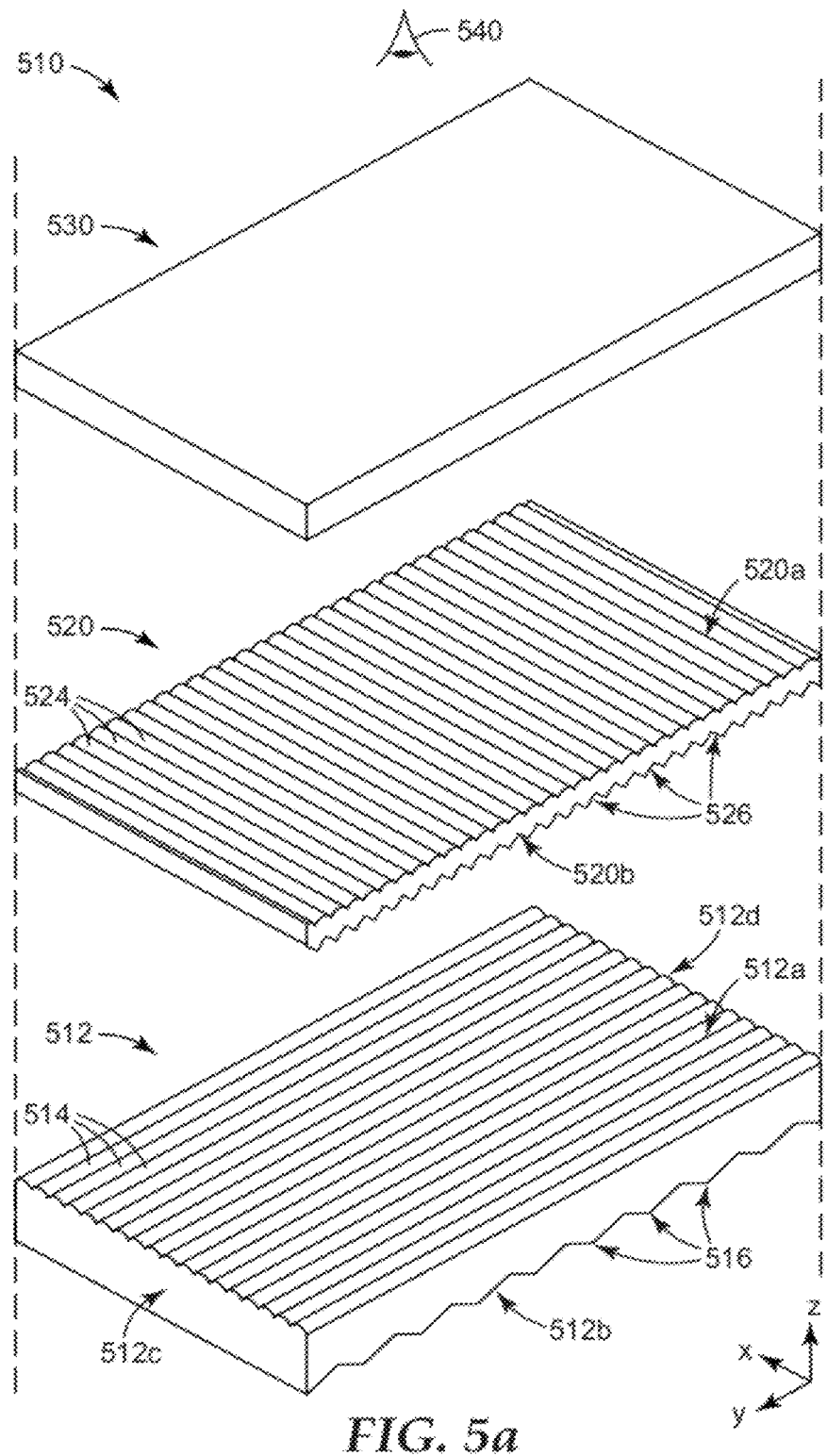
FIG. 5a is a schematic exploded view of an autosterescopic display.

In FIG. 5a, we see in exploded perspective view three main components of an autostereoscopic display 510: a light guide 512, a 3D light redirecting film 520, and a display panel 530. The light guide 512 has a front structured surface 512a shaped to provide a plurality of linear lenticular structures 514 that are parallel to each other and to a first in-plane lenticular axis, which in this case corresponds to the y-axis of the coordinate system. The light guide 512 has a rear structured surface 512b shaped to provide a plurality of linear prismatic structures 516 that are parallel to each other and to a first in-plane prismatic axis, which in this case corresponds to the x-axis of the coordinate system. The light guide 512 also has four side surfaces, including opposed side surfaces 512c, 512d. Light source assemblies would typically be placed at these side surfaces, one adjacent side surface 512c and another adjacent side surface 512d. The light source assemblies would thus be disposed at opposite ends of the light guide (or backlight of which the light guide is a part) along an in-plane axis which in this case corresponds to the y-axis of the coordinate system or the major axis of the light guide 512.

The 3D light redirecting film 520 has a front structured surface 520a shaped to provide a plurality of linear lenticular structures 524 that are parallel to each other and to a second in-plane lenticular axis, which in this case corresponds to the x-axis of the coordinate system. The film 520 also has a rear structured surface 520b shaped to provide a plurality of linear prismatic structures 526 that are parallel to each other and to a second in-plane prismatic axis, which in this case also corresponds to the x-axis.

The display panel 530 is shown only schematically, but it is generally aligned with the film 520 and light guide 512 such that their respective rectangular-shaped useable areas, and associated major and minor axes (in this case the y-axis and x-axis, respectively), are all nominally aligned with each other.

An observer 540 is shown schematically in a position above or in front of the display 510 so as to view images provided by the display. Of course, in order for the observer 540 to view images stereoscopically, he or she would have to use both eyes. Those eyes would moreover have to be positioned generally in the y-z plane. (Note for purposes of this application that being positioned in a given plane or along a given axis, and the like, generally includes being positioned in any plane that is parallel to the given plane, or being positioned along any axis that is parallel to the given axis, unless otherwise indicated.) In this orientation of the observer's eyes, the display 510 would be in a "landscape" configuration.

Figure 5B:
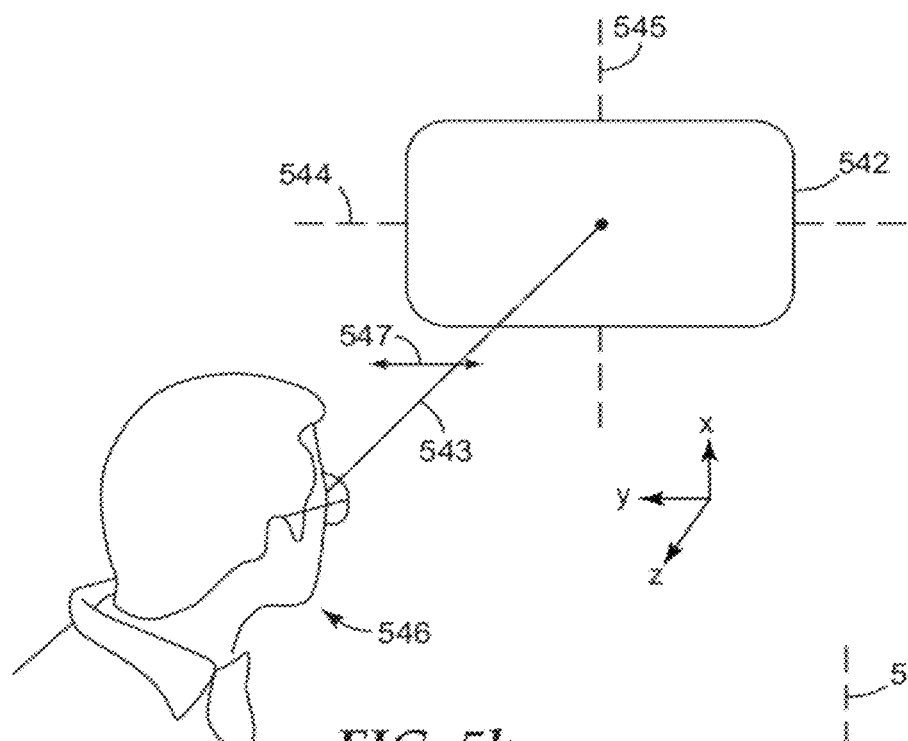
FIGS. 5b and 5c are schematic perspective views of an observer in two orthogonal orientations with respect to a display.

Such a landscape configuration is depicted in FIG. 5b. There, a user 546 is shown observing a useable area or output area 542 of a display. The output area is characterized by an optical axis 543 and in-plane axes 544, 545. The optical axis 543 is generally perpendicular to the output area 542 and to the axes 544, 545, and it intersects the output area at the center of the output area. The axes 544, 545 are generally perpendicular to each other, and correspond to major and minor axes of the output area 542. The two light sources (not shown) for the display are disposed at the opposed left and right edges of the output area, along (or at opposite ends of) the in-plane major axis 544.

The two eyes of the user 546 in FIG. 5b are aligned along a horizontal axis 547 which is generally parallel to the major axis 544. In this arrangement, the display output area 542 is in a landscape orientation. The user's head is also preferably positioned such that the two eyes of the user 546 are disposed on opposite sides of the optical axis 543. The display described in connection with FIG. 5a, and placed in the orientation of FIG. 5b, sends a right-eye light beam to the right eye of the user 546 when one light source assembly is energized, and sends a left-eye light beam to the left eye of the user 546 when the other light source assembly is energized. The user 546 is thus able to view the stereoscopic image in the configuration of FIG. 5b.

Figure 5C:
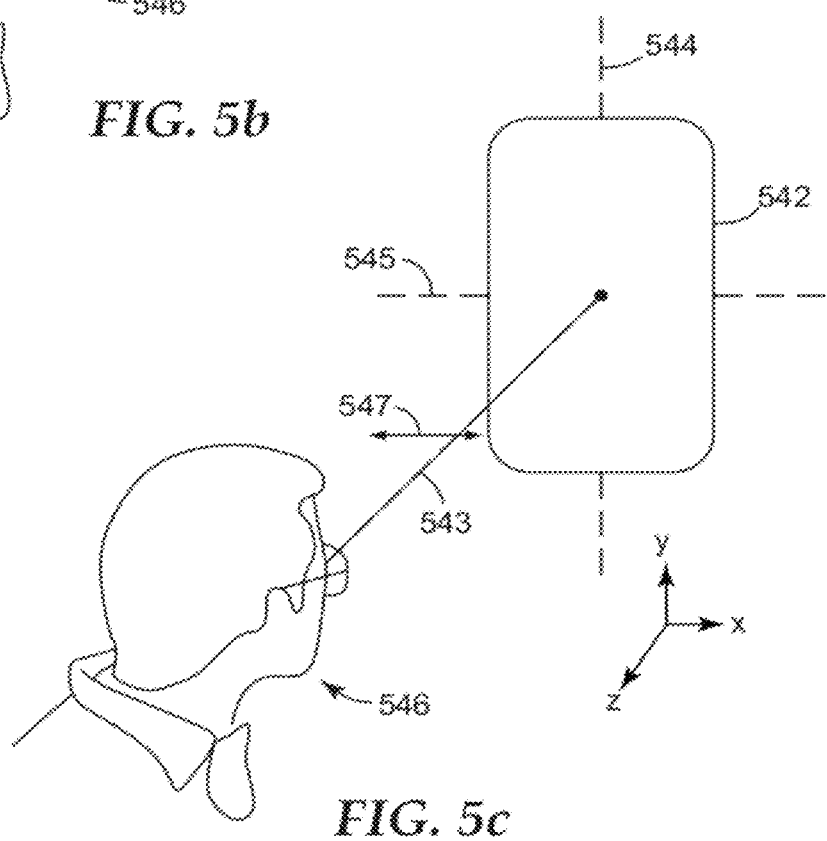

FIG. 5c depicts the same user 546 and same display output area 542 as shown in FIG. 5b, but the display (or the observer) has been rotated 90 degrees. In this case, the axis 547 along which the eyes of the user are aligned is parallel to the minor in-plane axis 545 and perpendicular to the major in-plane axis 545. In this orientation, the user 546 will not perceive any substantial stereoscopic image if the display is the same as that described in connection with FIG. 5a. This is because the right-eye and left-eye light beams emitted by the display will strike the user 546 slightly above or slightly below eye-level, or in any event the right-eye beam no longer is perceived predominantly by the user's right eye and the left-eye beam is no longer perceived predominantly by the user's left eye.

We have found that it is possible to construct autostereoscopic displays, and backlights therefor, that can provide good stereoscopic viewing for both landscape and portrait orientations of the display. More generally, we have found it possible to construct autostereoscopic displays and backlights that can provide good stereoscopic viewing for two orthogonal display orientations. We have found that such dual orientation autostereoscopic backlights and displays can be fabricated by changing the orientation of one or more structured surfaces compared to its or their orientations depicted in FIG. 5a. Such changes in structured surface orientation, which can also be characterized as rotations of a given structured surface about the optical axis of the display, are described in connection with FIG. 5d.

Figure 5D:
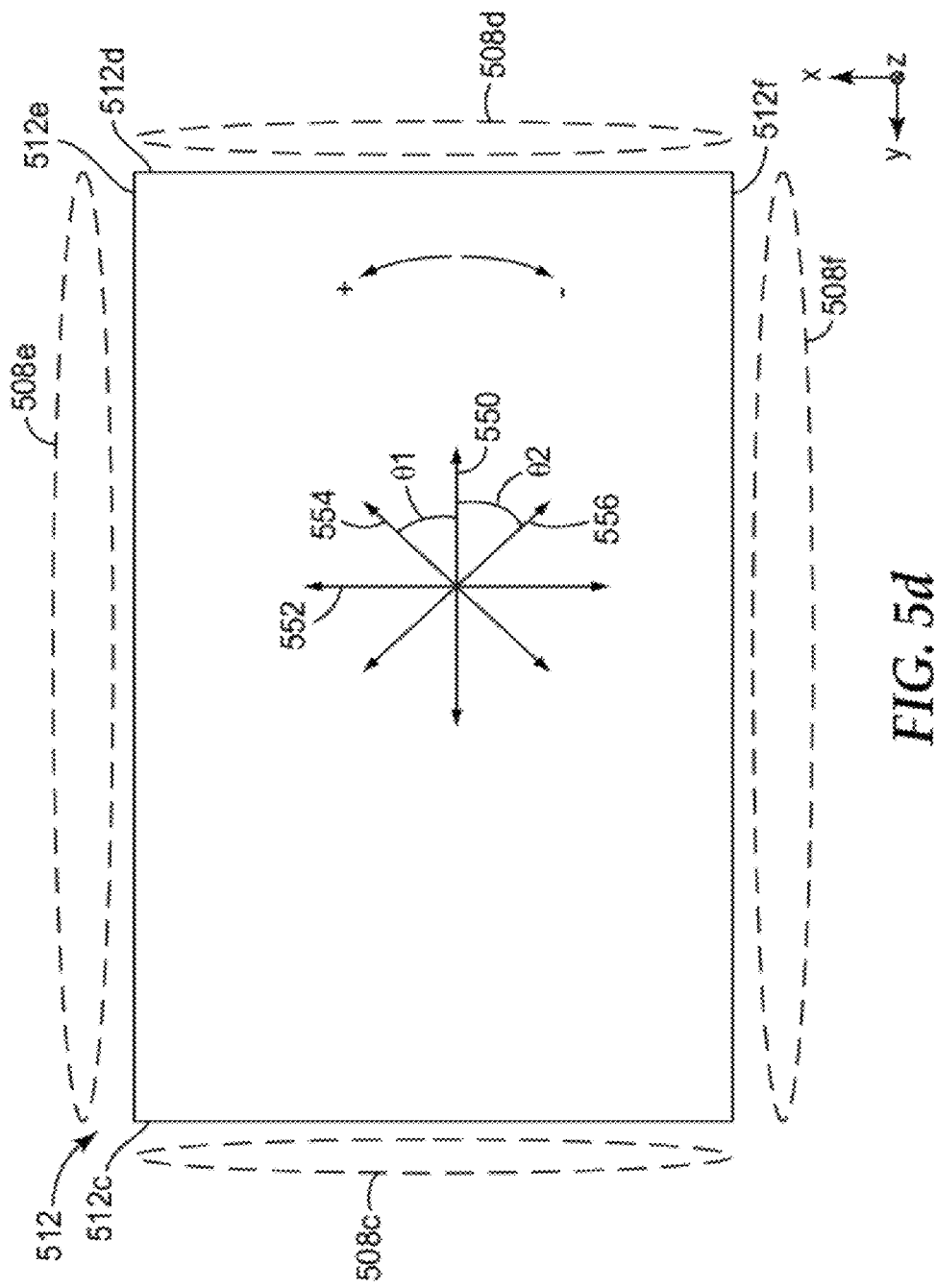
FIG. 5d is a schematic top or front view of a light guide or other component of an autostereoscopic backlight or display, with axes drawn to illustrate different potential orientations of structured surface features relative to a given in-plane axis of the light guide.

FIG. 5d is a schematic top or front view of a light guide 512 or other component of an autostereoscopic backlight or display, with axes drawn to illustrate different potential orientations of structured surface features relative to a given in-plane axis of the light guide. In connection with FIG. 5a, we learned that right- and left-eye light source assemblies such as assemblies 508c, 508d would be disposed at the side surfaces 512c, 512d respectively of the light guide, at opposite ends of an in-plane axis of the light guide, such as axis 550 shown in FIG. 5d. With the light sources disposed in this manner, the lenticular structures 524 and the prismatic structures 526 of the 3D film 520, and the prismatic structures 516 of the light guide, would all be oriented to be parallel to each other and perpendicular to the in-plane axis 550 (and parallel to the minor axis of the light guide, such as axis 552 in FIG. 5d). On the other hand, the lenticular structures 514 of the light guide would all be oriented to be parallel to each other and parallel to the in-plane axis 550.

By changing the orientation of one or more structured surfaces of the display, we can produce right- and left-eye light beams that support stereoscopic viewing in two orthogonal orientations. The direction or orientation of a given structured surface can be specified by an in-plane axis that corresponds to the direction along which the features of the structured surface are aligned. For example, the orientation of a structured surface comprising parallel linear prismatic structures can be characterized by an in-plane prism axis that the linear prismatic structures are parallel to. Similarly, the orientation of a structured surface comprising parallel linear lenticular structures can be characterized by an in-plane lenticular axis that the linear lenticular structures are parallel to. In general, each of the in-plane axes 550, 552, 554, 556 depicted in FIG. 5d, or any other in-plane axis, can represent the orientation of a given structured surface.

We may choose to describe the orientation of a given structured surface in at least two alternative ways. In a first approach, the orientation of the structured surface can be described by its rotation relative to the corresponding structured surface of the standard or baseline configuration shown in FIG. 5a. Counterclockwise rotations (as viewed from the perspective of a user) may be designated as positive, and clockwise rotations (as viewed from the same perspective) may be designated as negative. In an alternative approach, the orientation of the structured surface can be described by the angle it makes relative to a specified fixed in-plane axis, which we may choose to be the axis along which the opposed light sources are aligned. For example, if light source assemblies are disposed at positions 508c, 508d shown in FIG. 5d, then the angle θ between the structured surface features (e.g., an in-plane lenticular axis or an in-plane prism axis) and in-plane axis 550 can be used to characterize the orientation of each structured surface. For example, in-plane axis 554 makes an angle θ1 with axis 550, and in-plane axis 556 makes an angle θ2 with axis 550. Note that the fixed in-plane axis that forms the basis of angle measurement may be the major axis or minor axis of the light guide or 3D film. For example, if light source assemblies are disposed at positions 508e, 508f shown in FIG. 5d and not at positions 508c, 508d, then the fixed in-plane axis that forms the basis of angle measurement may be the minor axis 552. In some cases, the display or backlight may include light source assemblies at all four positions 508c, 508d, 508e, 508f, in which case either axis 550 or axis 552 may be selected as a basis for angle measurement. Furthermore, the useable area of the display or backlight may have a square shape with no major or minor in-plane dimension. In such cases either of the two primary orthogonal in-plane axes of the square could be arbitrarily designated to be a major axis and the other axis designated a minor axis.

Figure 6A:
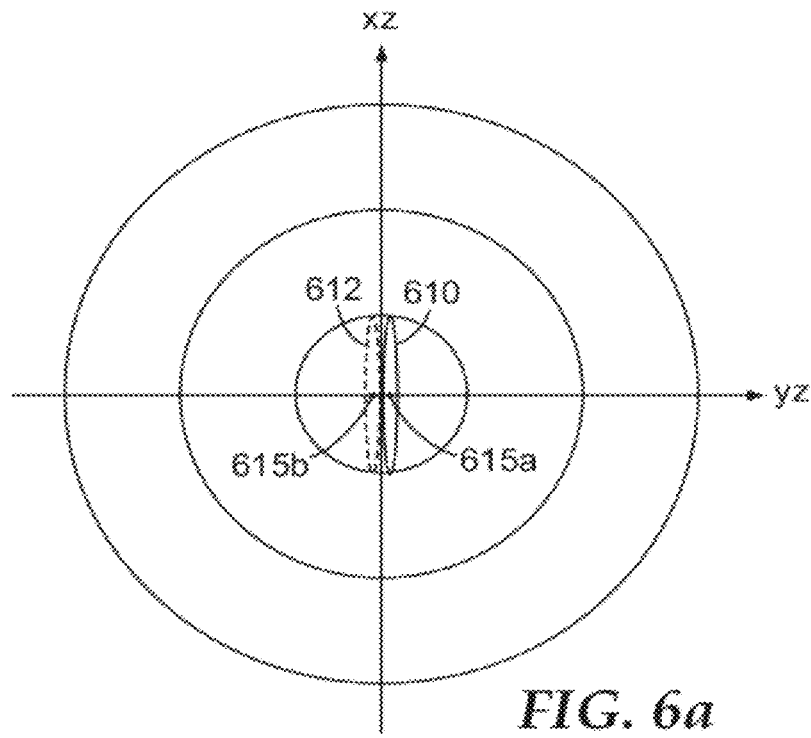
Figure 6B:
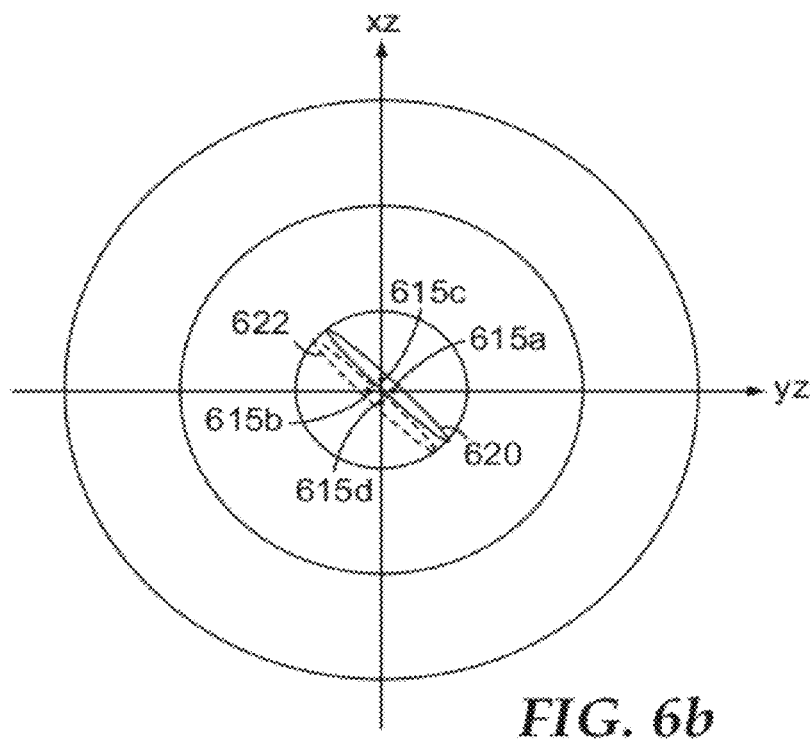

We have found that by judiciously rotating one or more of the structured surfaces relative to their orientations shown in FIG. 5a, the backlight and/or display can produce right-eye and left-eye output beams that allow the user to observe stereoscopic images in two orthogonal orientations. The light beams are elongated according to their intensity distribution as a function of propagation direction, e.g. by plotting the intensity distribution in a spherical coordinate system defined by a polar angle and an azimuthal angle. The elongated light beams are also offset from an optical axis of the backlight, and each of the elongated light beams is tilted or otherwise oriented to intersect both a first observation plane and a second observation plane perpendicular to the first observation plane, the first observation plane being defined by the optical axis and an in-plane axis along which the light sources are disposed. Reference in this regard is made to FIGS. 6a and 6b.

FIG. 6a is a schematic conoscopic graph of typical right- and left-eye light beams 610, 612 generated by the autostereoscopic display 510 and associated backlight depicted in FIG. 5a. A given point on the conoscopic graph corresponds to a given direction of emitted light, or a given observation direction for observing or measuring such light. (Unless otherwise noted, such observation or measurement is performed at the center of the output area of the backlight or display.) The center of the conoscopic graph corresponds to a direction perpendicular or normal to the output surface of the backlight, i.e., the optical axis of the backlight (with reference to FIG. 5a, the optical axis is an axis parallel to the z-axis but passing through the center of the rectangular working areas of components 512, 520, and 530). The concentric circles progressing outward from the center represent polar angles relative to the optical axis of 20, 40, 60, and 80 degrees. The horizontal axis of the conoscopic graph corresponds to the y-z plane in FIG. 5a, or, more precisely, is a plane that contains the optical axis of the backlight and passes through both of the opposed light source assemblies of the backlight. The vertical axis of the conoscopic graph corresponds to the x-z plane in FIG. 5a, or, more precisely, is a plane that contains the optical axis of the backlight and that is perpendicular to the plane associated with the horizontal axis.

Thus, in FIG. 6a, we see that the display and backlight of FIG. 5a produces an elongated right eye beam 610 when one of the light sources is energized. When the opposed light source is energized, an elongated left eye beam 612 is produced. The two light beams are offset from the optical axis, are disposed on opposite sides of the optical axis, and are substantially non-overlapping. When an observer is positioned in front of the display such that their right and left eyes, represented respectively by points 615a, 615b, are disposed in the y-z plane, the eyes of the observer line up properly with the light beams produced by the respective light sources, allowing the observer to view images stereoscopically from the display. However, if the observer, the display, or both were rotated relative to each other such that the observer's eyes were disposed in the x-z plane, then the right-eye and left-eye light beams emitted by the display would strike the observer slightly above or slightly below eye-level, or in any event the right-eye beam would no longer be perceived predominantly by the user's right eye, and the left-eye beam would no longer be perceived predominantly by the user's left eye, hence the observer could no longer view images stereoscopically from the display.

FIG. 6b shows in a schematic or representative fashion the changes in light output we have been able to achieve by modifying the orientation of one or more of the structured surfaces relative to their orientation in FIG. 5a. Such modified or changed orientations are discussed further below in connection with the examples. For purposes of FIG. 6b, we simply note that the right- and left-eye beams emitted by the backlight have been modified into right-eye beam 620 and left-eye beam 622. These beams are not only offset from the optical axis and elongated as a function of propagation direction, they are also rotated relative to the beams of FIG. 6a such that each of the beams 620, 622 intersects both the x-z obser- vation plane and the y-z observation plane. This unique arrangement allows an observer to view stereoscopic images in two orthogonal orientations. In one orientation, the observer's eyes (represented by points 615a, 615b) are disposed in the y-z plane. In this orientation the observer's right eye 615a lines up properly with the right eye light beam 620, and the observer's left eye 615b lines up properly with the left eye light beam 622. In the orthogonal orientation, the observer's eyes (represented now by points 615c, 615d) are disposed in the x-z plane. Note that in this orientation, the observer's right eye 615c again lines up properly with the right eye light beam 620, and the observer's left eye 615d again lines up properly with the left eye light beam 622. The system represented by FIG. 6b thus allows the observer to view images stereoscopically in each of two orthogonal orientations of the display, e.g., landscape and portrait.

Figure 7A:
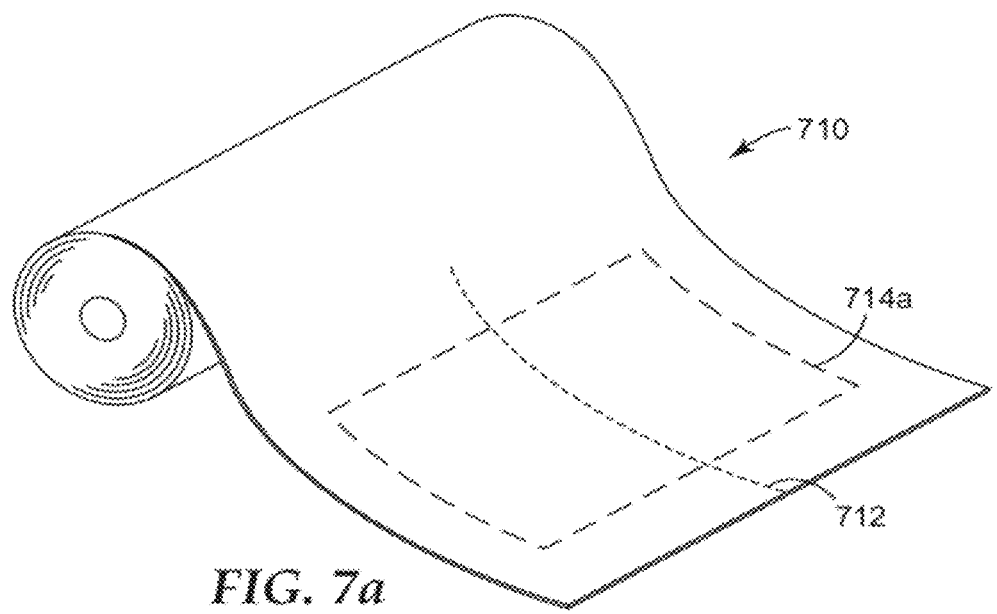
FIGS. 7a and 7b are perspective views of an optical film in roll form that is converted (e.g. cut) in different ways so as to provide optical film components with different structured surface orientations relative to major and minor in-plane axes of the optical film component.

In some cases, a given 3D light redirecting film and/or a given light guide for a stereoscopic backlight may be made using a continuous process that produces the article in roll form, as shown by the article 710 in FIG. 7a. The article 710 has a long axis 712 that corresponds to a down-web direction or machine axis of the process line used to make the article. The article 710 may have formed thereon structured surfaces such as a linear lenticular structured surface and a linear prismatic structured surface. For purposes of FIGS. 7a and 7b, we assume that such surfaces are oriented parallel or perpendicular to the long axis 712 of the article 710. In other words, the lenticular features of the linear lenticular structured surface that each extend parallel to an in-plane lenticular axis, and the prismatic features of the linear prismatic structured surface each extend parallel to an in-plane prismatic axis, and the lenticular axis is parallel or perpendicular to the long axis 712, and the prismatic axis may also be parallel or perpendicular to the long axis 712. If such an article 710 were used to produce the light redirecting film 520 of FIG. 5a, or the light guide 512 of FIG. 5a, the roll would be converted or cut into a rectangularly-shaped piece 714a whose major and minor axes are parallel or perpendicular to the long axis 712. Such a piece 714a has structured surfaces that are oriented parallel or perpendicular to the major (or minor) axis of the piece. In order to change the orientation of the structured surfaces relative to the major (or minor) axis of the piece, the article 710 may be converted or cut at a bias angle to produce a piece 714b. Unlike piece 714a, piece 714b has major and minor axes that are not parallel or perpendicular to the long axis 712, but are disposed at oblique angles thereto. As a result, the structured surfaces of piece 714b will be oriented at oblique angles relative to the major (or minor) axis of the piece.

Figure 7B:
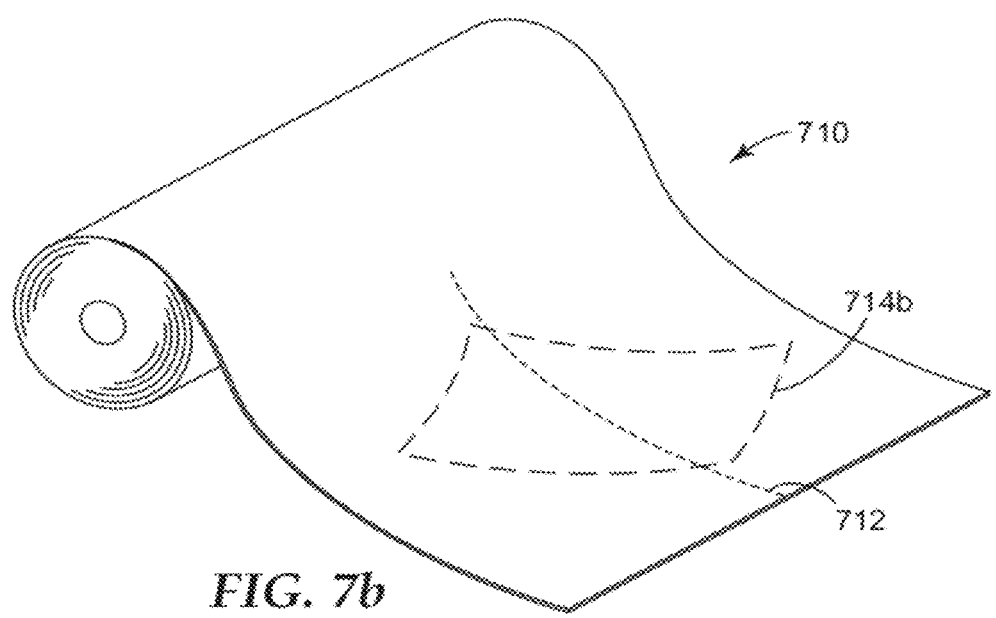

In cases where the article 710 is roll of a light redirecting film, the film may have on opposite sides thereof a first and second structured surface, the first structured surface including lenticular features that each extend parallel to an in-plane lenticular axis, and the second structured surface including prismatic features that each extend parallel to an in-plane prismatic axis. A rectangular piece of such film can be cut at a bias angle, as shown in FIG. 7b, such that at least one of the in-plane lenticular axis and the in-plane prismatic axis is perpendicular to neither the major axis nor the minor axis of the rectangle. In some cases, the in-plane lenticular axis may be parallel to the in-plane prismatic axis. In some cases, the in-plane lenticular axis may be disposed at an angle θ relative to the major axis (or the minor axis) of the rectangle, and θ may have a magnitude in a range from 9 to 81 degrees, or may have a magnitude of about 45 degrees.

EXAMPLES

Various example backlights were constructed and the output of the backlights was measured. The backlights used different orientations for the various structured surfaces, e.g., the lenticular and prismatic structured surfaces on the light redirecting film, and the lenticular and prismatic structured surfaces on the edge-lit light guide. In some cases, the light redirecting film was omitted so the output of the light guide by itself could be evaluated.

In each case, the light guide was fabricated by taking a 0.95 mm thick piece of acrylic (refractive index 1.49) and laminating on one side thereof a prismatic structured surface film (composed of PET with refractive index 1.57, and having an overall thickness of 0.020 mm) and on the other side thereof a lenticular structured surface film (composed of PET with refractive index 1.57, and having an overall thickness of 0.020 mm), the laminating being carried out with an optically clear adhesive. The light guide was generally rectangular, with the lengths of its major and minor in-plane axes being about 79 and 43 mm, respectively. The light redirecting film was fabricated by a two-sided continuous cast and cure process, and was composed of PET and had an overall thickness of about 0.011 mm. A rectangular piece of light redirecting film was cut from a larger sample, and the bias angle of the cut was selected to achieve a given orientation of the structured surface features with respect to the major or minor axis of the light redirecting film piece. The rectangular shape and in-plane dimensions of the light redirecting film were nominally the same as those of the light guide. A small air gap was present between the light redirecting film and the light guide.

Light source assemblies were placed adjacent the shorter side surfaces of the light guide, and these side surfaces were substantially flat and smooth for efficient light injection. Each light source assembly consisted of eight Nichia 206 LEDs soldered to a thin flexible circuit. The light source assemblies could be energized independently. Measurements of the output were made with a conoscopic camera system. The camera was disposed along the central axis of the backlight at a distance of about 1 mm from the backlight.

The output of each embodiment was measured for two operating conditions: (a) with the light source assembly on only one end of the light guide energized, and (b) with the light source assemblies on both ends of the light guide energized. These conditions allowed for an evaluation of both the right-eye beam and left-eye beam emitted from the center of the backlight. For each backlight and each operating condition, the measured output is depicted as a conoscopic graph of intensity, where the center of the graph corresponds to the optical axis of the backlight (perpendicular to the output surface of the backlight and passing through the center of the rectangular output area), the horizontal axis corresponds to the y-z plane in FIG. 5a (or, more precisely, a plane that contains the optical axis and that is parallel to the y-z plane), and the vertical axis corresponds to the x-z plane in FIG. 5a (or, more precisely, a plane that contains the optical axis and that is parallel to the x-z plane). The center of the conoscopic graph represents a polar angle of 0 degrees, and the concentric circles progressing outward from the center represent polar angles of 20, 40, 60, and 80 degrees. Accompanying the conoscopic plot in each figure is a plot of intensity versus polar angle in the plane associated with the horizontal axis of the conoscopic graph.

Table 1 below lists the orientations of the various structured surfaces that were used in the constructed examples, where reference is made to FIGS. 5a and 5b. For purposes of the table, the lower (prismatic) structured surface of the light guide (corresponding to surface 512b in FIG. 5a) is referred to as Surface D, the upper (lenticular) structured surface of the light guide (corresponding to surface 512a in FIG. 5a) is referred to as Surface C, the lower (prismatic) structured surface of the light redirecting film (corresponding to surface 520b in FIG. 5a) is referred to as Surface B, and the upper (lenticular) structured surface of the light redirecting film (corresponding to surface 520a in FIG. 5a) is referred to as Surface A. For purposes of the table, counterclockwise rotation about the z-axis of a given structured surface (and its features) relative to its corresponding structured surface as shown in FIG. 5a is deemed to be positive, and clockwise rotation is deemed to be negative—refer also to the rotation angle convention shown in FIG. 5d. To eliminate any possible ambiguity regarding the orientation of a given structured surface, the table also lists in parenthesis the angle that the features of each structured surface make with respect to a given fixed axis, where the fixed axis is the axis that connects the two opposed light sources (in the examples the light sources were disposed at the short ends of the light guide, see elements 508c and 508d of FIG. 5d, such that the fixed axis from which the angles in parenthesis are measured is an axis corresponding to major axis 550 in FIG. 5d).

Figures 1, 10B:
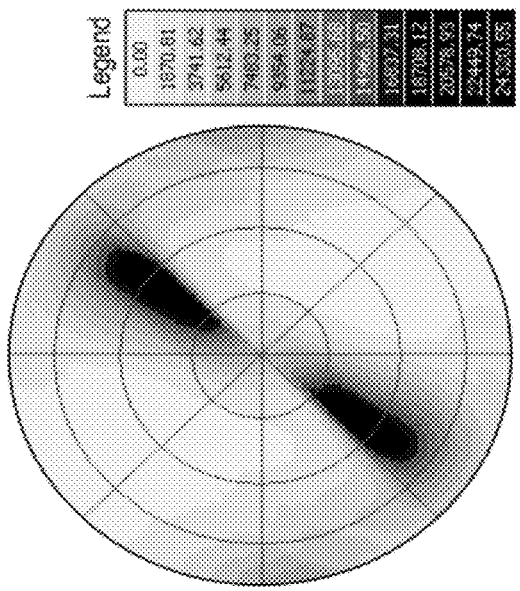
Figures 2, 10B:
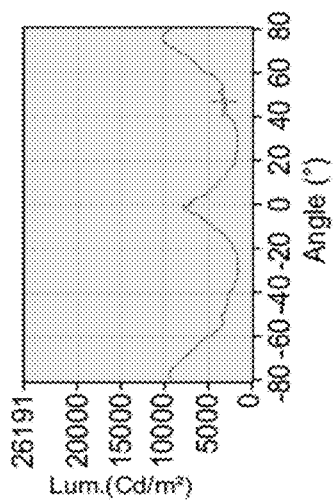
Figures 1, 10A:
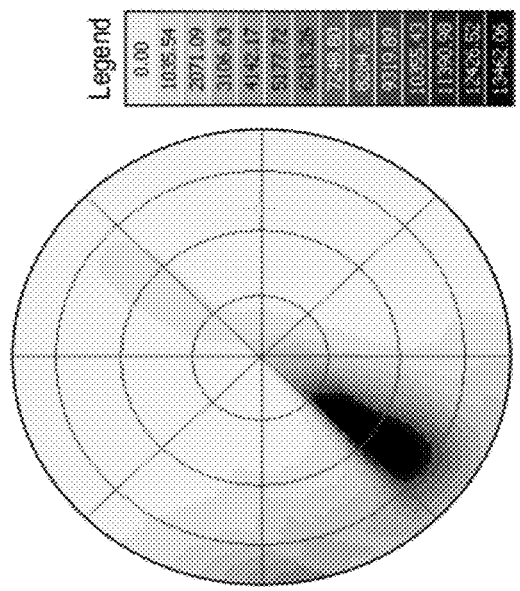
Figures 2, 10A:
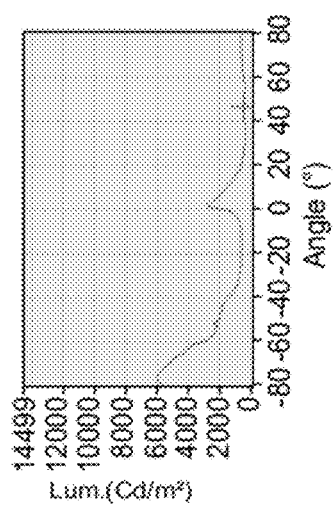
Figures 1, 2, 11A, 11B:
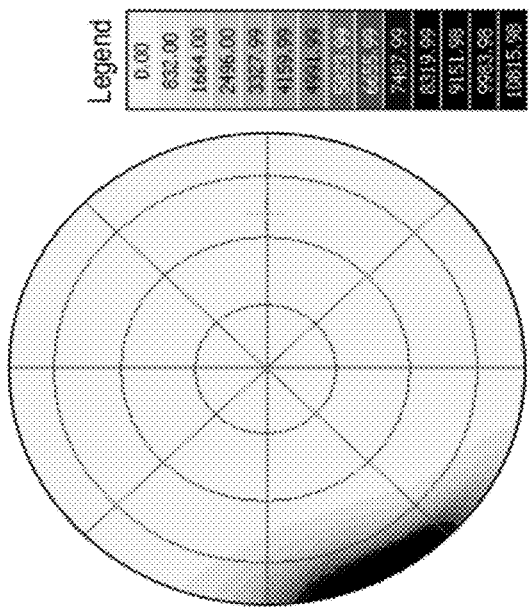
Figures 1, 12B:
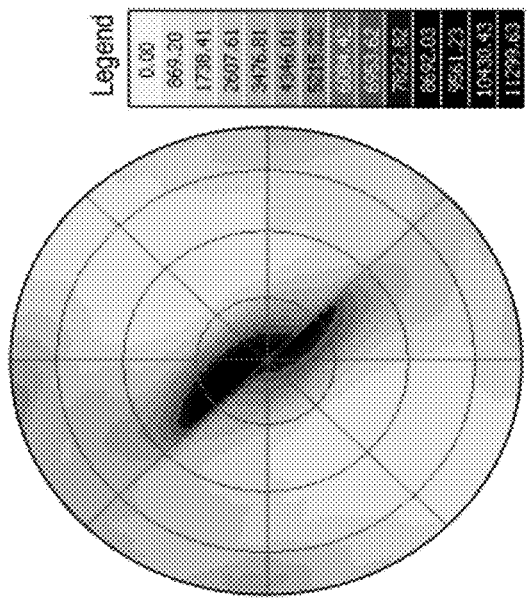
Figures 2, 12B:
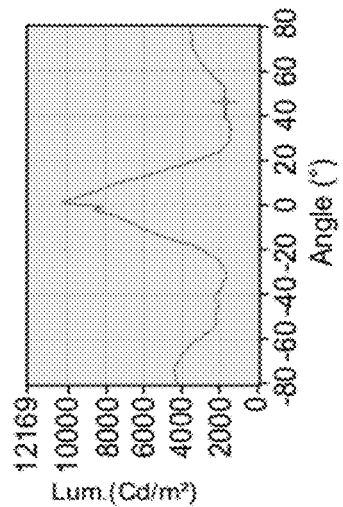
Figures 1, 12A:
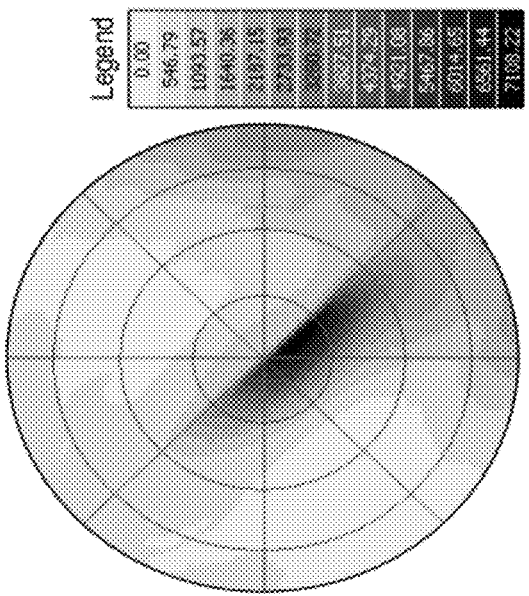
Figures 2, 12A:
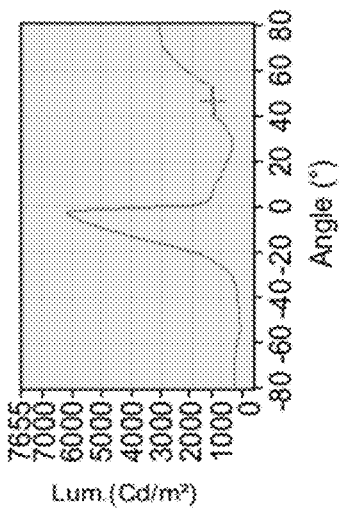
Figures 1, 13A:
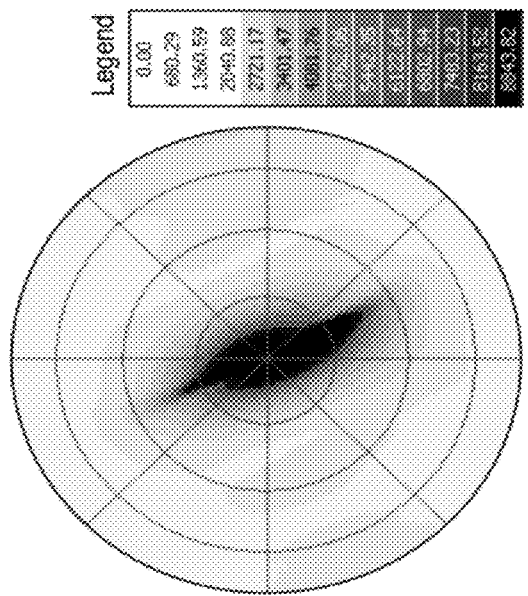
Figures 2, 13A:
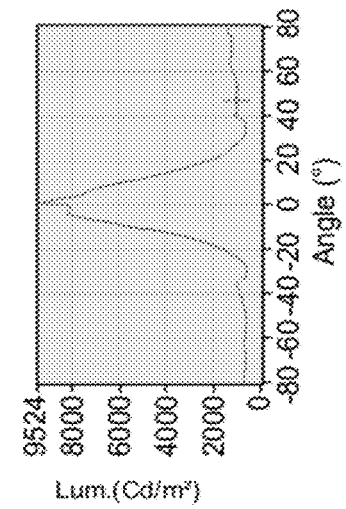
Figures 1, 13B:
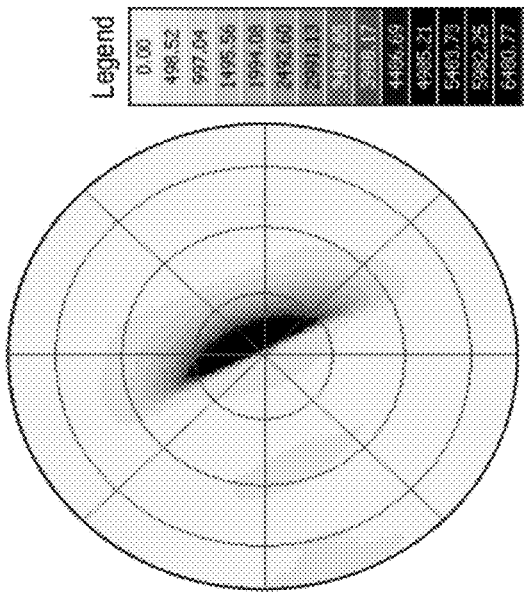
Figures 2, 13B:
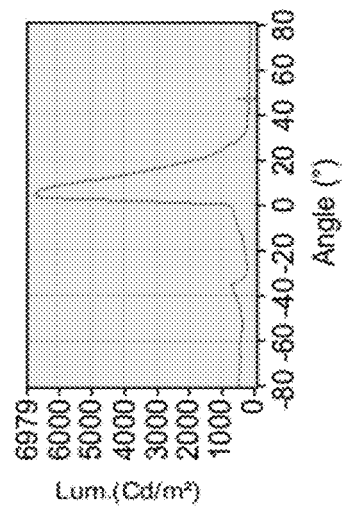
Figures 1, 2, 16A, 16B:
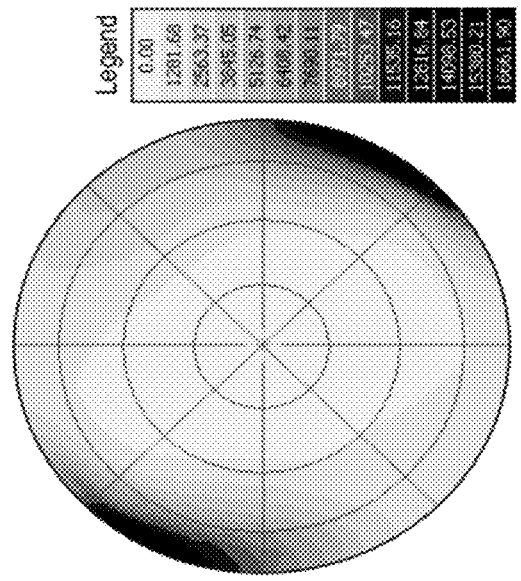

For example, referring to Table 1 below, FIGS. 10a-1 (with corresponding intensity plot along the horizontal axis shown in FIGS. 10a-2) and 10b-1 (with corresponding intensity plot along the horizontal axis shown in FIG. 10b-2) correspond to an example in which: the upper lenticular structured surface of the light redirecting film (Surface A) was rotated 45 degrees clockwise (−45 degrees) relative to the orientation of surface 520a in FIG. 5a, such that each extended lenticular feature on such surface was oriented at a 45 degree angle counterclockwise relative to the fixed axis (see axis 550 in FIG. 5d); the lower prismatic structured surface of the light redirecting film (Surface B) was rotated 45 degrees clockwise (−45 degrees) relative to the orientation of surface 520b in FIG. 5a, such that each extended prismatic feature on such surface was oriented at a 45 degree angle counterclockwise relative to the fixed axis (see axis 550 in FIG. 5d); the upper lenticular structured surface of the light guide (Surface C) was rotated 0 degrees relative to the orientation of surface 512a in FIG. 5a, such that each extended lenticular feature on such surface was oriented at a 0 degree angle (i.e., parallel) relative to the fixed axis (see axis 550 in FIG. 5d); and the lower prismatic structured surface of the light guide (Surface D) was rotated 0 degrees relative to the orientation of surface 512b in FIG. 5a, such that each extended prismatic feature on such surface was oriented at a 90 degree angle (i.e., perpendicular) relative to the fixed axis (see axis 550 in FIG. 5d). FIG. 10a-1 shows the output of this device when only one of the light source assemblies is energized, and FIG. 10b-1 shows the output when both light source assemblies are energized.

Unless otherwise noted, the surfaces and components had the following characteristics:
Surface A had a pitch of 46 microns and a radius of curvature of 31.7 microns;
Surface B had a pitch of 46 microns and prism apex angle of 30 degrees;
Surface C had a pitch of 72.6 microns and a radius of curvature of 35.6 microns; and
Surface D had a pitch of 81.6 microns and a prism apex angle of 172 degrees.

TABLE 1

| | Rotation angle relative to FIG. 5a (angle relative to axis 550 in FIG. 5d) | | | | |
|---|---|---|---|---|---|
| Figure | Surf A | Surf B | Surf C | Surf D | Notes |
| 8a-1, 8b-1 | | | 0 (0) | 0 (90) | |
| 9a-1, 9b-1 | 0 (90) | 0 (90) | 0 (0) | 0 (90) | |
| 10a-1, 10b-1 | −45 (+45) | −45 (+45) | 0 (0) | 0 (90) | |
| 11a-1, 11b-1 | | | +45 (+45) | 90 (0) | |
| 12a-1, 12b-1 | +45 (−45) | +45 (−45) | +45 (+45) | 90 (0) | Lenticular features of surf C were aspheric |
| 13a-1, 13b-1 | +22.5 (−67.5) | +22.5 (−67.5) | +45 (+45) | 90 (0) | Lenticular features of surf C were aspheric |
| 14a-1, 14b-1 | +45 (−45) | +45 (−45) | +45 (+45) | 0 (90) | |
| 15a-1, 15b-1 | +45 (−45) | +45 (−45) | +45 (+45) | +22.5 (−67.5) | |
| 16a-1, 16b-1 | | | −45 (−45) | −45 (+45) | Prism apex angle of surf D 176 degrees |

FIGS. 8a-1 and 8b-1 (and their corresponding intensity graphs 8a-2, 8b-2) depict the highly oblique output light emitted by the light guide alone (with no light redirecting film) when the structured surface orientations of FIG. 5a are used, and FIGS. 9a-1 and 9b-1 (and their corresponding intensity graphs 9a-2, 9b-2) depict the right-eye and left-eye light beams emitted by the device when a light redirecting film is added, again with structured surface orientations as shown in FIG. 5a. The remaining figures show the measured output light when different ones of the structured surfaces are rotated relative to their orientations shown in FIG. 5a. As one can see from Table 1, no light redirecting film was used in the embodiments associated with FIGS. 8a-1 and 8b-1, 11a-1 and 11b-1, or 16a-1 and 16b-1.

For the embodiment of FIGS. 12a-1 and 12b-1 and 13a-1 and 13b-1, the linear lenticular features on the structured surface on the top of the light guide were modified slightly relative to the other embodiments, so that they were aspheric, i.e., had a variable radius of curvature rather than a constant 35.6 micron radius of curvature. For the embodiment of FIGS. 16a-1 and 16b-1 (and their corresponding intensity graphs 16a-2, 16b-2), the linear prisms on the structured surface on the bottom of the light guide were modified slightly relative to the other embodiments, so that they had a prism apex angle of 176 degrees rather than 172 degrees.

From inspection of the figures, one can see that at least the embodiments of FIGS. 12a-1 and 12b-1, 13a-1 and 13b-1, 14a-1 and 14b-1, and 15a-1 and 15b-1 successfully produce right-eye and left-eye light beams that are elongated, offset from the optical axis of the backlight, and each beam being oriented to intersect both the x-z and y-z observation planes, such that stereoscopic viewing can be accomplished in both landscape and portrait orientations without having to change the placement of the light source assemblies, i.e., using the same light source assemblies for both orientations. The embodiment of FIGS. 10a-1 and 10b-1 could also be used to provide dual orientation stereoscopic viewing, but the brightness of the light beams near the optical axis for that embodiment is very low.

We found it beneficial (but not necessarily required) to keep the relative orientation of the structured surfaces on the opposite sides of the light redirecting film to be the same, such that they are oriented parallel to each other, but to rotate them both about 45 degrees relative to their orientation in FIG. 5a (and relative to the light guide). One surprising result of the examples was the benefit observed in rotating the prismatic structured surface on the back side of the light guide by 90 degrees relative to its orientation in FIG. 5a (and maintaining the same prism apex angle), which yielded desirable stereo lobe locations and improved brightness compared to rotations of 0 or 45 degrees for the prismatic structured surface.

Rotating both the prismatic and lenticular structured surfaces of the light guide together at 45 degrees in the same direction also produced highly desirable results. We found that this configuration worked best if the apex angle of the prisms was increased, e.g. from 172 to 176 degrees. This reduction in the apex angle of the prisms on the prismatic structured surface of the light guide reduces the amount of light extracted per unit length of the light path so that optimal brightness uniformity is observed in a given display. Note, the light extraction characteristics of the lenticular features on the other structured surface of the light guide cannot be ignored when their orientation is rotated from horizontal, i.e., when the lenticular structured surface of the light guide is rotated relative to its orientation in FIG. 5a. The light extraction from that lenticular structured surface can be compensated for or offset by changing the design features of the prismatic structured surface of the light guide to provide desirable extraction characteristics from the light guide. Peak brightness and efficiency of the light guide is obtained by rotating the 3D light redirecting film (relative to its orientation in FIG. 5a) by an amount equal to the rotation of the peak brightness of the light beams output by the light guide (such rotation can be seen by comparing, for example, FIG. 16b-1 with FIG. 8b-1). This rotation of the light beams is typically less than the physical rotation of the prismatic and lenticular features of the light guide, and is roughly 27 degrees when rotating the prismatic and lenticular features by 45 degrees.

Unless otherwise indicated, all numbers expressing quantities, measurement of properties, and so forth used in the specification and claims are to be understood as being modified by the term "about". Accordingly, unless indicated to the contrary, the numerical parameters set forth in the specification and claims are approximations that can vary depending on the desired properties sought to be obtained by those skilled in the art utilizing the teachings of the present application. Not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, to the extent any numerical values are set forth in specific examples described herein, they are reported as precisely as reasonably possible. Any numerical value, however, may well contain errors associated with testing or measurement limitations.

Various modifications and alterations of this invention will be apparent to those skilled in the art without departing from the spirit and scope of this invention, and it should be understood that this invention is not limited to the illustrative embodiments set forth herein. For example, the reader should assume that features of one disclosed embodiment can also be applied to all other disclosed embodiments unless otherwise indicated. It should also be understood that all U.S. patents, patent application publications, and other patent and non-patent documents referred to herein are incorporated by reference, to the extent they do not contradict the foregoing disclosure.

The invention claimed is:

1. A backlight suitable for use in an autostereoscopic display, the backlight comprising:
    a light guide having first and second side surfaces adapted to receive light from respective first and second light sources, the first and second side surfaces being disposed on opposite ends of a first in-plane axis of the light guide, the light guide also having opposed first and second structured surfaces, the first structured surface comprising lenticular features that each extend parallel to an in-plane lenticular axis, and the second structured surface comprising prismatic features that each extend parallel to an in-plane prismatic axis; and
    a light redirecting film disposed to receive light from the light guide;
    wherein the in-plane lenticular axis is not parallel to the first in-plane axis, or the in-plane prismatic axis is not perpendicular to the first in-plane axis, or both.

2. The backlight of claim 1, wherein the in-plane lenticular axis is disposed at an angle θ relative to the first in-plane axis, and θ has a magnitude in a range from 23 to 67 degrees.

3. The backlight of claim 2, wherein the magnitude of θ is about 45 degrees.

4. The backlight of claim 1, wherein the in-plane prismatic axis is disposed at an angle θ relative to the first in-plane axis, and θ has a magnitude in a range from 0 to 45 degrees.

5. The backlight of claim 4, wherein the magnitude of θ is about 0 degrees.

6. The backlight of claim 4, wherein the magnitude of θ is about 45 degrees.

7. The backlight of claim 1, wherein the in-plane lenticular axis is not perpendicular to the in-plane prismatic axis.

8. The backlight of claim 7, wherein the in-plane lenticular axis is disposed at an angle θ relative to the in-plane prismatic axis, and θ has a magnitude in a range from 45 to 81 degrees.

9. The backlight of claim 8, wherein the magnitude of θ is about 45 degrees.

10. The backlight of claim 8, wherein the magnitude of θ is in a range from 65 to 70 degrees.

11. The backlight of claim 1, wherein the in-plane lenticular axis is disposed at an angle in a range from 23 to 67 degrees relative to first in-plane axis, and the in-plane prismatic axis is disposed at an angle in a range from 23 to 67 degrees relative to the first in-plane axis.

12. The backlight if claim 11, wherein the in-plane lenticular axis is perpendicular to the in-plane prismatic axis.

13. The backlight of claim 1, wherein the light redirecting film has opposed third and fourth structured surfaces, the third structured surface comprising lenticular features that each extend parallel to a second in-plane lenticular axis, and the fourth structured surface comprising prismatic features that each extend parallel to a second in-plane prismatic axis.

14. The backlight of claim 13, wherein the second in-plane lenticular axis is parallel to the second in-plane prismatic axis, and wherein the second in-plane lenticular axis is not perpendicular to the first in-plane axis.

15. The backlight of claim 14, wherein the second in-plane lenticular axis is disposed at an angle θ relative to the first in-plane axis, and θ has a magnitude in a range from 9 to 81 degrees.

16. The backlight of claim 15, wherein the magnitude of θ is about 45 degrees.

17. The backlight of claim 15, wherein the magnitude of θ is in a range from 65 to 70 degrees.

18. An autostereoscopic display, comprising:
    the backlight of claim 1;
    a display disposed in front of the backlight; and
    a controller coupled to the backlight and to the display, the controller adapted to coordinate operation of the first and second light sources of the backlight with operation of the display.

19. A backlight having an output area characterized by an optical axis and first and second orthogonal in-plane axes, the optical axis and the first in-plane axis defining a first observation plane, and the optical axis and the second in-plane axis defining a second observation plane orthogonal to the first observation plane, the backlight including a first and second light source assembly disposed at opposite ends of the backlight along the first in-plane axis, the backlight being adapted to transmit light received from the first light source assembly into a first elongated light beam emitted from the output area, the first elongated light beam being offset from the optical axis and oriented to intersect both the first and second observation planes, wherein the backlight is further adapted to transmit light received from the second light source assembly into a second elongated light beam emitted from the output area, the second elongated light beam being offset from the optical axis and oriented to intersect both the first and second observation planes.

20. The backlight of claim 19, wherein the optical axis lies between the first and second elongated light beams.

21. The backlight of claim 19, wherein the first and second light beams are oriented to allow a viewer to observe a stereoscopic image from a display disposed in front of the backlight, both when the viewer's eyes are disposed in the first observation plane and when the viewer's eyes are disposed in the second observation plane.

22. A backlight having an output area characterized by an optical axis and first and second orthogonal in-plane axes, the optical axis and the first in-plane axis defining a first observation plane, and the optical axis and the second in-plane axis defining a second observation plane orthogonal to the first observation plane, the backlight including a first and second light source assembly disposed at opposite ends of the backlight along the first in-plane axis, the backlight being adapted to transmit light received from the first light source assembly into a first elongated light beam emitted from the output area, the first elongated light beam being offset from the optical axis and oriented to intersect both the first and second observation planes, wherein the backlight comprises:
    a light guide having first and second side surfaces adapted to receive light from the first and second light source assemblies respectively, the first and second side surfaces being disposed on opposite ends of the light guide along the first in-plane axis, the light guide also having opposed first and second structured surfaces, the first structured surface comprising lenticular features that each extend parallel to an in-plane lenticular axis, and the second structured surface comprising prismatic features that each extend parallel to an in-plane prismatic axis; and a light redirecting film disposed to receive light from the light guide;

wherein the in-plane lenticular axis is not parallel to the first in-plane axis, or the in-plane prismatic axis is not perpendicular to the first in-plane axis, or both.

23. A light redirecting film suitable for use in an autostereoscopic backlight, the film having mutually orthogonal in-plane major and minor axes, the film also having opposed first and second structured surfaces, the first structured surface comprising lenticular features that each extend parallel to an in-plane lenticular axis, and the second structured surface comprising prismatic features that each extend parallel to an in-plane prismatic axis, wherein at least one of the in-plane lenticular axis and the in-plane prismatic axis is perpendicular to neither the major axis nor the minor axis, and wherein the in-plane lenticular axis is parallel to the in-plane prismatic axis, and wherein the in-plane lenticular axis is disposed at an angle 8 relative to the major axis, and θ has a magnitude of about 45 degrees.

24. An autostereoscopic backlight comprising the light redirecting film of claim 23.

\* \* \* \* \*

UNITED STATES PATENT AND TRADEMARK OFFICE
CERTIFICATE OF CORRECTION

| | | |
|---|---|---|
| PATENT NO. | : 8,988,336 B2 | Page 1 of 1 |
| APPLICATION NO. | : 12/969995 | |
| DATED | : March 24, 2015 | |
| INVENTOR(S) | : Erik Aho et al. | |

It is certified that error appears in the above-identified patent and that said Letters Patent is hereby corrected as shown below:

In the claims,

Col. 21, line 58, in Claim 12, delete "if" and insert -- of --.

Col. 22, line 40, in Claim 21, delete "display" and insert -- display panel --.

Col. 23, line 18, in Claim 23, delete "angle 8" and insert -- angle $\theta$ --.

Signed and Sealed this
Seventeenth Day of November, 2015

Michelle K. Lee
*Director of the United States Patent and Trademark Office*